(12) United States Patent
Ying et al.

(10) Patent No.: US 10,320,754 B2
(45) Date of Patent: Jun. 11, 2019

(54) DATA TRANSMISSION METHOD AND APPARATUS

(71) Applicant: Huawei Technologies Co., Ltd., Shenzhen, Guangdong (CN)

(72) Inventors: Jiangwei Ying, Beijing (CN); Jing Chen, Shanghai (CN); Lingli Pang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 490 days.

(21) Appl. No.: 14/885,235

(22) Filed: Oct. 16, 2015

(65) Prior Publication Data

US 2016/0044002 A1 Feb. 11, 2016

Related U.S. Application Data

(63) Continuation of application No. PCT/CN2013/074324, filed on Apr. 17, 2013.

(51) Int. Cl.
*H04L 29/06* (2006.01)
*H04W 4/70* (2018.01)
(Continued)

(52) U.S. Cl.
CPC .......... *H04L 63/0428* (2013.01); *H04L 9/14* (2013.01); *H04L 12/06* (2013.01);
(Continued)

(58) Field of Classification Search
CPC .................................................. H04L 63/0428
See application file for complete search history.

(56) References Cited

U.S. PATENT DOCUMENTS

| 2004/0162077 | A1* | 8/2004 | Kauranen | H04W 48/18 |
| | | | | 455/445 |
| 2008/0039087 | A1* | 2/2008 | Gallagher | H04W 8/04 |
| | | | | 455/435.2 |

(Continued)

FOREIGN PATENT DOCUMENTS

| CN | 101645877 A | 2/2010 |
| CN | 102017680 A | 4/2011 |

(Continued)

OTHER PUBLICATIONS

3rd Generation Partnership Project; Technical Specification Group Radio Access Network; Radio Resource Control (RRC); Protocol specification (Release 11); 3GPP TS 25.331 V11.5.0, Mar. 2013, 2079 pages.

(Continued)

*Primary Examiner* — Simon P Kanaan

(57) ABSTRACT

The present invention provides a data transmission method and apparatus, where the method includes: performing, by UE, security processing on a NAS PDU by using a security parameter and a security algorithm, where data to be transmitted is encapsulated in the NAS PDU; and sending, by the UE, the NAS PDU to a serving SGSN by using an RNC. The present invention can improve efficiency of transmitting a small data packet, and further provide a security mechanism to ensure security of transmitting the small data packet.

10 Claims, 12 Drawing Sheets

UE performs security processing on a NAS PDU by using a security parameter and a security algorithm, where data to be transmitted is encapsulated in the NAS PDU — 101

The UE sends the NAS PDU to a serving SGSN by using an RNC — 102

(51) Int. Cl.
*H04L 9/14* (2006.01)
*H04L 29/08* (2006.01)
*H04L 12/06* (2006.01)
*H04W 12/04* (2009.01)
*H04W 88/02* (2009.01)
*H04W 88/12* (2009.01)
*H04W 12/02* (2009.01)
*H04W 12/10* (2009.01)

(52) U.S. Cl.
CPC ........... *H04L 67/1097* (2013.01); *H04W 4/70* (2018.02); *H04W 12/04* (2013.01); *H04W 12/02* (2013.01); *H04W 12/10* (2013.01); *H04W 88/02* (2013.01); *H04W 88/12* (2013.01)

(56) References Cited

U.S. PATENT DOCUMENTS

| | | | |
|---|---|---|---|
| 2008/0043669 A1* | 2/2008 | Gallagher | H04W 92/02 370/329 |
| 2008/0076425 A1* | 3/2008 | Khetawat | H04W 88/12 455/436 |
| 2009/0270099 A1* | 10/2009 | Gallagher | H04W 8/08 455/435.1 |
| 2010/0077459 A1* | 3/2010 | Mahdi | H04W 36/0022 726/4 |
| 2011/0075675 A1* | 3/2011 | Koodli | H04L 12/14 370/401 |
| 2011/0111731 A1 | 5/2011 | Iwamura et al. | |
| 2012/0082161 A1* | 4/2012 | Leung | H04L 12/4633 370/392 |
| 2013/0083726 A1* | 4/2013 | Jain | H04W 4/70 370/328 |
| 2015/0078280 A1* | 3/2015 | Lecroart | H04W 48/10 370/329 |

FOREIGN PATENT DOCUMENTS

| | | |
|---|---|---|
| CN | 102209320 A | 10/2011 |
| CN | 102740287 A | 10/2012 |
| WO | WO 2012/149982 A1 | 11/2012 |

OTHER PUBLICATIONS

3rd Generation Partnership Project; Technical Specification Group Services and System Aspects; Security aspects of Machine-Type and other Mobile Data Applications Communications Enhancements; (Release 12); 3GPP TR 33.868 V0.12.0, Jan. 2013, 76 pages.

* cited by examiner

DATA TRANSMISSION METHOD AND APPARATUS

CROSS-REFERENCE TO RELATED APPLICATIONS

This application is a continuation of International Application No. PCT/CN2013/074324, filed on Apr. 17, 2013, which is hereby incorporated by reference in its entirety.

TECHNICAL FIELD

The present invention relates to the communications technologies, and in particular, to a data transmission method and apparatus.

BACKGROUND

With the wide application of smart terminals (Smart Phone) and Machine Type Communications (Machine Type Communications, MTC for short) devices, transmission of small data packets becomes increasingly frequent. For example, for a service such as email push (Email Push), instant messaging software MSN or QQ, and a virtual private network (Virtual Private Network, VPN for short) supported by a smart phone, within a period of time during which no service data takes place, to maintain a connection with a server, a keepalive (keep alive) message needs to be exchanged with the server, where the message is a small data packet; for another example, for a service such as smart meter reading, smart traffic, and smart medical care in a Machine to Machine (Machine to Machine, M2M for short) service supported by an MTC device, data transmitted in the service is also a small data packet. In a Universal Mobile Telecommunications System (Universal Mobile Telecommunication System, UMTS for short), user equipment (User Equipment, UE for short) that performs such a service is usually set to an idle mode, and once the UE has a small data packet that needs to be sent, a Radio Resource Control (Radio Resource Control, RRC for short) connection is then set up to send the small data packet.

However, an existing procedure of transmitting a small data packet is lengthy, resulting in a delay in data transmission and relatively low transmission efficiency.

SUMMARY

Embodiments of the present invention provide a data transmission method and apparatus, so as to improve efficiency of transmitting a small data packet, and further provide a security mechanism to ensure security of transmitting the small data packet.

According to a first aspect, an embodiment of the present invention provides a data transmission method, including:
performing, by user equipment UE, security processing on a non-access stratum protocol data unit NAS PDU by using a security parameter and a security algorithm, where data to be transmitted is encapsulated in the NAS PDU; and
sending, by the UE, the NAS PDU to a Serving General Packet Radio Service Support Node SGSN by using a radio network controller RNC.

In a first possible implementation manner of the first aspect, the security parameter includes: a cipher key CK_small and/or an integrity protection key IK_small; and
the security algorithm includes: a cipher algorithm and/or an integrity protection algorithm.

According to the first possible implementation manner of the first aspect, in a second possible implementation manner, before the performing, by UE, security processing on a NAS PDU by using a security parameter and a security algorithm, the method further includes:
negotiating, by the UE, with the SGSN to determine the security parameter.

According to the second possible implementation manner of the first aspect, in a third possible implementation manner, the negotiating, by the UE, with the SGSN to determine the security parameter includes:
negotiating, by the UE, with the SGSN by performing an authentication and key agreement AKA process to determine the security parameter.

According to the third possible implementation manner of the first aspect, in a fourth possible implementation manner, the negotiating, by the UE with the SGSN by performing an AKA process to determine the security parameter includes:
negotiating, by the UE, with the SGSN by performing the AKA process to determine to use a cipher key CK in the AKA process as CK_small, and/or determine to use an integrity protection key IK in the AKA process as IK_small.

According to the third possible implementation manner of the first aspect, in a fifth possible implementation manner, the negotiating, by the UE with the SGSN by performing an AKA process to determine the security parameter includes:
negotiating, by the UE, with the SGSN by performing the AKA process to determine to use Formula (1) to acquire CK_small, and/or determine to use Formula (2) to acquire IK_small;

$$CK\_small = HMAC\text{-}SHA\text{-}256(A1, A2, \text{cipher label}) \quad (1)$$

$$IK\_small = HMAC\text{-}SHA\text{-}256(A1, A2, \text{integrity label}) \quad (2)$$

where HMAC-SHA-256 is a key generation function, A1 and A2 are input parameters of the key generation function HMAC-SHA-256, A1 is CK, or a new character string [CK∥IK] obtained by joining character strings of CK and IK, A2 is a random number RAND in an authentication vector AV generated by an authentication center AuC in the AKA process, cipher label is a cipher algorithm label, and integrity label is an integrity protection algorithm label.

According to the fifth possible implementation manner of the first aspect, in a sixth possible implementation manner, the negotiating, by the UE, with the SGSN to determine the security parameter includes:
receiving, by the UE in a security mode command SMC process, a random number Nonce sent by the SGSN; and
using, by the UE, Formula (1) to acquire CK_small, and/or determining to use Formula (2) to acquire IK_small,
where A2 is the random number Nonce.

According to the first aspect or any one of the first to sixth possible implementation manners of the first aspect, in a seventh possible implementation manner, before the performing, by UE, security processing on a NAS PDU by using a security parameter and a security algorithm, the method further includes:
negotiating, by the UE, with the SGSN to determine the security algorithm.

According to the seventh possible implementation manner of the first aspect, in an eighth possible implementation manner, the negotiating, by the UE, with the SGSN to determine the security algorithm includes:

negotiating, by the UE, with the SGSN by using a registration procedure of the UE to determine the security algorithm.

According to the eighth possible implementation manner of the first aspect, in a ninth possible implementation manner, the negotiating, by the UE, with the SGSN by using a registration procedure of the UE to determine the security algorithm includes:

adding, by the UE, a security algorithm supported by the UE to a registration request Attach Request message or a routing area update request RAU Request message, and sending the registration request Attach Request message or the routing area update request RAU Request message to the SGSN; and receiving, by the UE, an SMC message sent by the SGSN, where the SMC message includes the security algorithm that is determined by the SGSN according to the security algorithm supported by the UE, or, receiving, by the UE, a registration accept Attach accept message or a routing area accept RAU accept message sent by the SGSN, where the registration accept Attach accept message or the routing area accept RAU accept message includes the security algorithm that is determined by the SGSN according to the security algorithm supported by the UE.

According to the seventh possible implementation manner of the first aspect, in a tenth possible implementation manner, the negotiating, by the UE, with the SGSN to determine the security algorithm includes:

negotiating, by the UE, with the SGSN by using a procedure of an inter-SGSN handover of the UE to determine the security algorithm.

According to the tenth possible implementation manner of the first aspect, in an eleventh possible implementation manner, the negotiating, by the UE, with the SGSN by using a procedure of an inter-SGSN handover of the UE to determine the security algorithm includes:

receiving, by the UE, a radio access network mobility information RAN Mobility information message sent by a target RNC in the inter-SGSN handover, where the radio access network mobility information message includes the security algorithm determined by a target SGSN in the inter-SGSN handover.

According to the seventh possible implementation manner of the first aspect, in a twelfth possible implementation manner, the negotiating, by the UE, with the SGSN to determine the security algorithm includes:

negotiating, by the UE, with the SGSN by using a service request Service Request process of the UE to determine a security algorithm of a service; and negotiating, by the UE, with the SGSN to determine to use the security algorithm of the service as the security algorithm.

According to the twelfth possible implementation manner of the first aspect, in a thirteenth possible implementation manner, the negotiating, by the UE, with the SGSN by using a service request Service Request process of the UE to determine a security algorithm of a service includes:

receiving, by the UE, a security mode command SMC message sent by the RNC, where the SMC message carries the security algorithm of the service; and after the negotiating, by the UE, with the SGSN to determine to use the security algorithm of the service as the security algorithm, the method includes:

saving, by the UE, the security algorithm; and when the UE receives a next SMC message sent by the RNC, using a security algorithm of a service carried in the next SMC message as the security algorithm.

According to the first aspect or any one of the first to thirteenth possible implementation manners of the first aspect, in a fourteenth possible implementation manner, the sending, by the UE, the NAS PDU to an SGSN includes:

sending, by the UE, an RRC Connection Setup Complete message to the RNC, where the RRC Connection Setup Complete message carries the NAS PDU, so that the RNC sends the NAS PDU to the SGSN.

According to the fourteenth possible implementation manner of the first aspect, in a fifteenth possible implementation manner, before the sending, by the UE, an RRC Connection Setup Complete message to the RNC, the method further includes:

sending, by the UE, an RRC connection request message to the RNC, where the RRC connection request message includes a small data indication.

According to the fourteenth or fifteenth possible implementation manner of the first aspect, in a sixteenth possible implementation manner, the RRC Connection Setup Complete message specifically includes: the NAS PDU and a key set identifier KSI, where the KSI is used for enabling the SGSN to search for security context for deciphering the NAS PDU.

According to the first aspect or any one of the first to sixth possible implementation manners of the first aspect, in a seventeenth possible implementation manner, before the performing, by UE, security processing on a NAS PDU by using a security parameter and a security algorithm, the method further includes:

configuring, on the UE, a security algorithm same as a small data security algorithm on the RNC as the security algorithm.

According to the first aspect or any one of the first to the thirteenth and the seventeenth possible implementation manners of the first aspect, in an eighteenth possible implementation manner, the sending, by the UE, the NAS PDU to an SGSN includes:

sending, by the UE, an RRC Connection Setup Complete message to the RNC, where the RRC Connection Setup Complete message carries the NAS PDU, so that the RNC obtains the NAS PDU through deciphering and sends the NAS PDU to the SGSN.

According to the eighteenth possible implementation manner of the first aspect, in a nineteenth possible implementation manner, before the sending, by the UE, an RRC Connection Setup Complete message to the RNC, the method further includes:

receiving, by the UE, an RRC Connection Setup message sent by the RNC, where the RRC Connection Setup message includes a fresh value Fresh; and the performing, by UE, security processing on a NAS PDU by using a security parameter and a security algorithm includes:

performing, by the UE, security processing on the NAS PDU by using the security parameter, the security algorithm, and the Fresh.

According to the nineteenth possible implementation manner of the first aspect, in a twentieth possible implementation manner, before the receiving, by the UE, an RRC Connection Setup message sent by the RNC, the method further includes:

sending, by the UE, an RRC connection request message to the RNC, where the RRC connection request message includes a small data indication and a KSI, so that the RNC sends the small data indication and the KSI to the SGSN.

According to the nineteenth or twentieth possible implementation manner of the first aspect, in a twenty-first possible implementation manner, the performing, by UE, security processing on a NAS PDU by using a security parameter and a security algorithm includes:

performing, by the UE, security processing on the NAS PDU by using the security parameter, the security algorithm, and an anti-replay parameter; and the RRC Connection Setup Complete message sent by the UE to the RNC further carries the anti-replay parameter.

According to the twenty-first possible implementation manner of the first aspect, in a twenty-second possible implementation manner, the anti-replay parameter includes: a start value Start and a fresh value Fresh; or, Count_C and/or Count_I generated according to a start value Start, and a fresh value Fresh; or, Count_C_small and/or Count_I_small dedicated to small data.

According to the twenty-first possible implementation manner of the first aspect, in a twenty-third possible implementation manner, the RRC connection request message sent by the UE to the RNC further carries a first random number Nonce_UE generated by the UE;

the RRC Connection Setup message sent by the RNC and received by the UE further carries a second random number Nonce_RNC generated by the RNC; and the anti-replay parameter includes: the first random number Nonce_UE and the second random number Nonce_RNC.

According to the first aspect or any one of the first to sixth possible implementation manners of the first aspect, in a twenty-fourth possible implementation manner, before the performing, by UE, security processing on a NAS PDU by using a security parameter and a security algorithm, the method further includes:

receiving, by the UE, an RRC Connection Setup message sent by the RNC, where the RRC Connection Setup message includes a security algorithm indicated by the RNC.

According to the twenty-fourth possible implementation manner of the first aspect, in a twenty-fifth possible implementation manner, the RRC Connection Setup message received by the UE further includes: a Fresh value generated by the RNC and a security algorithm supported by the UE.

According to the twenty-fourth possible implementation manner of the first aspect, in a twenty-sixth possible implementation manner, before the receiving, by the UE, an RRC Connection Setup message sent by the RNC, the method further includes:

sending, by the UE, an RRC connection request message to the RNC, where the RRC connection request message includes a small data indication, a KSI, and a security algorithm supported by the UE; and the security algorithm that is indicated by the RNC and included in the RRC Connection Setup message received by the UE is determined by the RNC according to the security algorithm supported by the UE.

According to a second aspect, an embodiment of the present invention provides a data transmission method, including:

receiving, by a radio network controller RNC, a non-access stratum protocol data unit NAS PDU that is sent by user equipment UE and has undergone security processing, where data to be transmitted is encapsulated in the NAS PDU; and sending, by the RNC, the NAS PDU to a Serving General Packet Radio Service Support Node SGSN.

In a first possible implementation manner of the second aspect, the security processing includes: security processing performed on the NAS PDU by using a security parameter and a security algorithm, where the security parameter includes: a cipher key CK_small and/or an integrity protection key IK_small; and the security algorithm includes: a cipher algorithm and/or an integrity protection algorithm.

According to the first possible implementation manner of the second aspect, in a second possible implementation manner, before the receiving, by an RNC, a NAS PDU that is sent by UE and has undergone security processing, the method further includes:

receiving, by the RNC, a security mode command SMC message sent by the SGSN, where the SMC message includes a random number Nonce generated by the SGSN; and sending, by the RNC, where the SMC message includes the random number Nonce to the UE, so that the UE acquires the security parameter according to the random number Nonce.

According to the first or second possible implementation manner of the second aspect, in a third possible implementation manner, before the receiving, by an RNC, a NAS PDU that is sent by UE and has undergone security processing, the method further includes:

receiving, by the RNC in a registration procedure of the UE, a message that is sent by the UE and includes a security algorithm supported by the UE, and sending the message to the SGSN; and receiving, by the RNC, a message that is sent by the SGSN and includes a security algorithm indicated by the SGSN, and sending the message to the UE.

According to the first or second possible implementation manner of the second aspect, in a fourth possible implementation manner, before the receiving, by an RNC, a NAS PDU that is sent by UE and has undergone security processing, the method further includes:

receiving, by the RNC in a procedure of an inter-SGSN handover of the UE, a relocation request Relocation Request message that is sent by a target SGSN and includes a security algorithm indicated by the target SGSN; and sending, by the RNC, a radio access network mobility information RAN Mobility information message to the UE, where the radio access network mobility information message includes the security algorithm indicated by the target SGSN.

According to the second aspect or any one of the first to fourth possible implementation manners of the second aspect, in a fifth possible implementation manner, the receiving, by an RNC, a NAS PDU that is sent by UE and has undergone security processing includes:

receiving, by the RNC, an RRC Connection Setup Complete message sent by the UE, where the RRC Connection Setup Complete message carries the NAS PDU, a key set identifier KSI, and an anti-replay parameter; and the sending, by the RNC, the NAS PDU to an SGSN includes:

sending, by the RNC, the NAS PDU, the KSI, and the anti-replay parameter to the SGSN, where the KSI is used for enabling the SGSN to search for security context for deciphering the NAS PDU.

According to the fifth possible implementation manner of the second aspect, in a sixth possible implementation manner, the anti-replay parameter includes: a start value Start and a fresh value Fresh; or, Count_C and/or Count_I generated according to a start value Start, and a fresh value Fresh; or, Count_C_small and/or Count_I_small dedicated to small data.

According to the fifth or sixth possible implementation manner of the second aspect, in a seventh possible implementation manner, before the receiving, by the RNC, an RRC Connection Setup Complete message sent by the UE, the method further includes:

receiving, by the RNC, an RRC connection request message sent by the UE, where the RRC connection request message includes a small data indication.

According to the first or second possible implementation manner of the second aspect, in an eighth possible implementation manner, before the receiving, by an RNC, a NAS PDU that is sent by UE and has undergone security processing, the method further includes:

configuring, on the RNC, a security algorithm same as a small data security algorithm of the UE as the security algorithm.

According to the first to fourth and eighth possible implementation manners of the second aspect, in a ninth possible implementation manner, before the sending, by the RNC, the NAS PDU to an SGSN, the method further includes:

deciphering, by the RNC, the NAS PDU.

According to the ninth possible implementation manner of the second aspect, in a tenth possible implementation manner, before the deciphering, by the RNC, the NAS PDU, the method further includes:

sending, by the RNC, a security parameter acquisition request message to the SGSN, where the security parameter acquisition request message includes a key set identifier KSI of the UE, or, the security parameter acquisition request message includes a KSI of the UE and a small data indication;

receiving, by the RNC, a security parameter response message sent by the SGSN, where the security parameter response message includes a security parameter corresponding to the KSI, or, receiving, by the RNC, a security parameter response message sent by the SGSN, where the security parameter response message includes a security parameter corresponding to the KSI and Count_C_small and/or Count_I_small dedicated to small data, and updating, by the RNC, Count_C_small and/or Count_I_small dedicated to small data; and after the sending, by the RNC, the NAS PDU to an SGSN, the method further includes: sending, by the RNC, the updated Count_C_small and/or Count_I_small dedicated to small data to the SGSN, so that the SGSN updates the Count_C_small and/or Count_I_small dedicated to small data.

According to the tenth possible implementation manner of the second aspect, in an eleventh possible implementation manner, the security parameter response message further includes: a security algorithm selected by the SGSN.

According to the tenth or eleventh possible implementation manner of the second aspect, in a twelfth possible implementation manner, the security parameter acquisition request message is an initial UE message, and the security parameter response message is a command ID message or a Direct Transfer message, or, the security parameter acquisition request message is an uplink information exchange request message, and the security parameter response message is an uplink information exchange response message.

According to any one of the ninth to twelfth possible implementation manners of the second aspect, in a thirteenth possible implementation manner, before the receiving, by an RNC, a NAS PDU that is sent by UE and has undergone security processing, the method further includes:

sending, by the RNC, an RRC Connection Setup message to the UE, where the RRC Connection Setup message includes a fresh value Fresh;

the receiving, by an RNC, a NAS PDU that is sent by UE and has undergone security processing includes:

receiving, by the RNC, an RRC Connection Setup Complete message sent by the UE, where the RRC Connection Setup Complete message carries the NAS PDU that has undergone security processing performed by using the security algorithm, the security parameter, and the fresh value Fresh; and the deciphering, by the RNC, the NAS PDU includes:

deciphering, by the RNC, the NAS PDU by using the security algorithm, the security parameter, and the fresh value Fresh.

According to the thirteenth possible implementation manner of the second aspect, in a fourteenth possible implementation manner, before the sending, by the RNC, an RRC Connection Setup message to the UE, the method further includes:

receiving, by the RNC, an RRC connection request message sent by the UE, where the RRC connection request message includes a small data indication and a KSI; or, the RRC Connection Setup Complete message sent by the UE and received by the RNC further includes: a KSI; and the security parameter acquisition request message sent by the RNC to the SGSN carries the small data indication and the KSI, so as to enable the SGSN to search for security context of the NAS PDU.

According to the thirteenth or fourteenth possible implementation manner of the second aspect, in a fifteenth possible implementation manner, the NAS PDU carried in the RRC Connection Setup Complete message is the NAS PDU that has undergone security processing performed by using the security algorithm, the security parameter, and an anti-replay parameter;

the RRC Connection Setup message further includes: the anti-replay parameter; and the deciphering, by the RNC, the NAS PDU includes:

deciphering, by the RNC, the NAS PDU by using the security algorithm, the security parameter, and the anti-replay parameter.

According to the fourteenth possible implementation manner of the second aspect, in a sixteenth possible implementation manner, the RRC connection request message sent by the UE and received by the RNC further carries a first random number Nonce_UE generated by the UE;

the RRC Connection Setup message sent by the RNC to the UE further carries a second random number Nonce_RNC generated by the RNC; and the anti-replay parameter includes: the first random number Nonce_UE and the second random number Nonce_RNC.

According to the thirteenth possible implementation manner of the second aspect, in a seventeenth possible implementation manner, before the sending, by the RNC, an RRC Connection Setup message to the UE, the method further includes:

determining, by the RNC, a security algorithm of current transmission; and the RRC Connection Setup message sent by the RNC to the UE includes indication information of the security algorithm of current transmission determined by the RNC, the Fresh value, and the security algorithm supported by the UE.

According to the seventeenth possible implementation manner of the second aspect, in an eighteenth possible implementation manner, an RRC connection request message received by the RNC and sent by the UE further includes the security algorithm supported by the UE;

the security parameter response message received by the RNC and sent by the SGSN further includes a security algorithm supported by the SGSN;

the determining, by the RNC, a security algorithm of current transmission includes:

determining, by the RNC, the security algorithm of current transmission according to the security algorithm supported by the UE and the security algorithm supported by the SGSN; and the RRC Connection Setup message sent by the RNC to the UE includes the indication information of the security algorithm of current transmission determined by the RNC, the Fresh value, and the security algorithm supported by the UE.

According to a third aspect, an embodiment of the present invention provides a data transmission method, including:

receiving, by a Serving General Packet Radio Service Support Node SGSN, a non-access stratum protocol data unit NAS PDU sent by a radio network controller RNC, where the NAS PDU is sent by user equipment UE to the RNC after the UE performs security processing on the NAS PDU by using a security algorithm and a security parameter.

In a first possible implementation manner of the third aspect, the security parameter includes: a cipher key CK_small and/or an integrity protection key IK_small; and the security algorithm includes: a cipher algorithm and/or an integrity protection algorithm.

According to the first possible implementation manner of the third aspect, in a second possible implementation manner, before the receiving, by an SGSN, a NAS PDU that is sent by UE and has undergone security processing performed by using a security algorithm and a security parameter, the method further includes:

negotiating, by the SGSN, with the UE to determine the security parameter.

According to the second possible implementation manner of the third aspect, in a third possible implementation manner, the negotiating, by the SGSN, with the UE to determine the security parameter includes:

negotiating, by the SGSN, with the UE by performing an authentication and key agreement AKA process to determine the security parameter.

According to the third possible implementation manner of the third aspect, in a fourth possible implementation manner, the negotiating, by the SGSN, with the UE by using an AKA process to determine the security parameter includes:

negotiating, by the SGSN, with the UE by performing the AKA process to determine to use a cipher key CK in the AKA process as CK_small, and/or determine to use an integrity protection key IK in the AKA process as IK_small.

According to the third possible implementation manner of the third aspect, in a fifth possible implementation manner, the negotiating, by the SGSN, with the UE by using an AKA process to determine the security parameter includes:

negotiating, by the SGSN, with the UE by performing the AKA process to determine to use Formula (1) to acquire CK_small, and/or determine to use Formula (2) to acquire IK_small;

$$CK\_small = HMAC\text{-}SHA\text{-}256(A1, A2, \text{cipher label}) \quad (1)$$

$$IK\_small = HMAC\text{-}SHA\text{-}256(A1, A2, \text{integrity label}) \quad (2)$$

where HMAC-SHA-256 is a key generation function, A1 and A2 are input parameters of the key generation function HMAC-SHA-256, A1 is CK, or a new character string [CK||IK] obtained by joining character strings of CK and IK, A2 is a random number RAND in an authentication vector AV generated by an authentication center AuC in the AKA process, cipher label is a cipher algorithm label, and integrity label is an integrity protection algorithm label.

According to the fifth possible implementation manner of the third aspect, in a sixth possible implementation manner, the negotiating, by the SGSN, with the UE to determine the security parameter includes:

sending, by the SGSN, a random number Nonce to the UE in a security mode command SMC process; and using, by the SGSN and the UE, Formula (1) to acquire CK_small, and/or determining to use Formula (2) to acquire IK_small, where A2 is the random number Nonce.

According to the third aspect or the first to sixth possible implementation manners of the third aspect, in a seventh possible implementation manner, before the receiving, by an SGSN, a NAS PDU sent by an RNC, the method further includes:

negotiating, by the SGSN, with the UE to determine the security algorithm.

According to the seventh possible implementation manner of the third aspect, in an eighth possible implementation manner, the negotiating, by the SGSN, with the UE to determine the security algorithm includes:

negotiating, by the SGSN, with the UE by using a registration procedure of the UE to determine the security algorithm.

According to the eighth possible implementation manner of the third aspect, in a ninth possible implementation manner, the negotiating, by the SGSN, with the UE by using a registration procedure of the UE to determine the security algorithm includes:

receiving, by the SGSN, a registration request Attach request message or a routing area update request RAU Request message that is sent by the UE and includes a security algorithm supported by the UE; and sending, by the SGSN, a registration accept Attach Accept message or a routing area accept RAU accept message to the UE, where the registration accept Attach accept message or the routing area accept RAU accept message includes the security algorithm that is determined by the SGSN according to the security algorithm supported by the UE, or, sending, by the SGSN, an SMC message to the UE, where the SMC message includes the security algorithm that is determined by the SGSN according to the security algorithm supported by the UE.

According to the seventh possible implementation manner of the third aspect, in a tenth possible implementation manner, the negotiating, by the SGSN, with the UE to determine the security algorithm includes:

negotiating, by the SGSN, with the UE by using a procedure of an inter-SGSN handover of the UE to determine the security algorithm.

According to the tenth possible implementation manner of the third aspect, in an eleventh possible implementation manner, the negotiating, by the SGSN, with the UE by using a procedure of an inter-SGSN handover of the UE to determine the security algorithm includes:

receiving, by a target SGSN in the inter-SGSN handover, a forward relocation request message sent by a source SGSN, where the forward relocation request message includes a security algorithm determined by the source SGSN, the security parameter of the UE, and the security algorithm supported by the UE; and sending, by the target SGSN, a relocation request message to a target RNC, where the relocation request message includes the security algorithm determined by the target SGSN.

According to the seventh possible implementation manner of the third aspect, in a twelfth possible implementation manner, the negotiating, by the SGSN, with the UE to determine the security algorithm includes:

negotiating, by the SGSN, with the UE by using a service request Service Request process of the UE to determine a security algorithm of a service; and negotiating, by the SGSN, with the UE to determine to use the security algorithm of the service as the security algorithm.

According to the twelfth possible implementation manner of the third aspect, in a thirteenth possible implementation manner, the negotiating, by the SGSN, with the UE by using a service request Service Request process of the UE to determine a security algorithm of a service includes:

receiving, by the SGSN, a security mode command SMC complete message sent by the RNC, where the SMC complete message carries the security algorithm of the service; and after the negotiating, by the SGSN, with the UE to determine to use the security algorithm of the service as the security algorithm, the method includes:

saving, by the SGSN, the security algorithm; and when the SGSN receives a next SMC complete message sent by the RNC, using a security algorithm of a service carried in the next SMC complete message as the security algorithm.

According to the third aspect or the first to thirteenth possible implementation manners of the third aspect, in a fourteenth possible implementation manner, the receiving, by an SGSN, a NAS PDU that is sent by UE and has undergone security processing performed by using a security algorithm and a security parameter includes:

receiving, by the SGSN, a message that is sent by the RNC and includes the NAS PDU, where the NAS PDU is sent by the UE and received by the RNC and has undergone security processing performed by the UE by using the security algorithm and the security parameter; and deciphering, by the SGSN, the NAS PDU.

According to the fourteenth possible implementation manner of the third aspect, in a fifteenth possible implementation manner, the message that is sent by the RNC and received by the SGSN and includes the NAS PDU further carries a key set identifier KSI, where the KSI is used for enabling the SGSN to search for security context for deciphering the NAS PDU; and the deciphering, by the SGSN, the NAS PDU includes:
deciphering, by the SGSN, the NAS PDU by using the security context.

According to the fifteenth possible implementation manner of the third aspect, in a sixteenth possible implementation manner, the message that is sent by the RNC and received by the SGSN and includes the NAS PDU further carries an anti-replay parameter; and the deciphering, by the SGSN, the NAS PDU includes:
deciphering, by the SGSN, the NAS PDU by using the security context and the anti-replay parameter.

According to the third aspect or the first to thirteenth possible implementation manners of the third aspect, in a seventeenth possible implementation manner, the receiving, by an SGSN, a NAS PDU sent by an RNC includes:

receiving, by the SGSN, a message that is sent by the RNC and includes the NAS PDU, where the NAS PDU is sent by the UE and received by the RNC, has undergone security processing performed by the UE by using the security algorithm and the security parameter, and has undergone deciphering by the RNC.

According to the seventeenth possible implementation manner of the third aspect, in an eighteenth possible implementation manner, before the receiving, by an SGSN, a NAS PDU that is sent by UE and has undergone security processing performed by using a security algorithm and a security parameter, the method further includes:

receiving, by the SGSN, a security parameter acquisition request message sent by the RNC, where the security parameter acquisition request message includes a Key set identifier KSI of the UE and a small data indication; and sending, by the SGSN, a security parameter response message to the RNC, where the security parameter response message includes a security parameter corresponding to the Key set identifier.

According to the eighteenth possible implementation manner of the third aspect, in a nineteenth possible implementation manner, the security parameter response message sent by the SGSN to the RNC further includes: a security algorithm selected by the SGSN.

According to the eighteenth or nineteenth possible implementation manner of the third aspect, in a twentieth possible implementation manner, the security parameter response message sent by the SGSN to the RNC further includes: Count_C_small and/or Count_I_small dedicated to small data; and after the receiving, by the SGSN, a message that is sent by the RNC and includes the NAS PDU, the method further includes: receiving, by the SGSN, updated Count_C_small and/or Count_I_small dedicated to small data sent by the RNC.

According to the eighteenth possible implementation manner of the third aspect, in a twenty-first possible implementation manner, the security parameter acquisition request message is an initial UE message, and the security parameter response message is a command ID message or a Direct Transfer message, or, the security parameter acquisition request message is an uplink information exchange request message, and the security parameter response message is an uplink information exchange response message.

According to a fourth aspect, an embodiment of the present invention provides a data transmission apparatus, including:

a processing module, configured to perform security processing on a non-access stratum protocol data unit NAS PDU by using a security parameter and a security algorithm, where data to be transmitted is encapsulated in the NAS PDU; and a sending module, configured to send the NAS PDU to a Serving General Packet Radio Service Support Node SGSN by using a radio network controller RNC.

In a first possible implementation manner of the fourth aspect, the security parameter includes: a cipher key CK_small and/or an integrity protection key IK_small; and the security algorithm includes: a cipher algorithm and/or an integrity protection algorithm.

According to the first possible implementation manner of the fourth aspect, in a second possible implementation manner, the apparatus further includes:

a security parameter negotiation module, configured to: before security processing is performed on the NAS PDU by using the security parameter and the security algorithm, negotiate with the SGSN to determine the security parameter.

According to the first or second possible implementation manner of the fourth aspect, in a third possible implementation manner, the apparatus further includes:

a security algorithm negotiation module, configured to: before security processing is performed on the NAS PDU by using the security parameter and the security algorithm, negotiate with the SGSN to determine the security algorithm.

According to the fourth aspect or any one of the first to third possible implementation manners of the fourth aspect, in a fourth possible implementation manner, the sending module is specifically configured to:

send an RRC Connection Setup Complete message to the RNC, where the RRC Connection Setup Complete message carries the NAS PDU, so that the RNC sends the NAS PDU to the SGSN.

According to the fourth possible implementation manner of the fourth aspect, in a fifth possible implementation manner, the sending module is further configured to:

send an RRC connection request message to the RNC, where the RRC connection request message includes a small data indication.

According to the fourth aspect or any one of the first to fifth possible implementation manners of the fourth aspect, in a sixth possible implementation manner, the sending module is specifically configured to:

send an RRC Connection Setup Complete message to the RNC, where the RRC Connection Setup Complete message carries the NAS PDU, so that the RNC obtains the NAS PDU through deciphering and sends the NAS PDU to the SGSN.

According to the sixth possible implementation manner of the fourth aspect, in a seventh possible implementation manner, the apparatus further includes:

a parameter transfer module, configured to: before the RRC Connection Setup Complete message is sent to the RNC, receive, by the UE, an RRC Connection Setup message sent by the RNC, where the RRC Connection Setup message includes a fresh value Fresh; and the processing module is specifically configured to:

perform security processing on the NAS PDU by using the security parameter, the security algorithm, and the Fresh.

According to the seventh possible implementation manner of the fourth aspect, in an eighth possible implementation manner, the processing module is specifically configured to:

perform security processing on the NAS PDU by using the security parameter, the security algorithm, and an anti-replay parameter; and the RRC Connection Setup Complete message further carries the anti-replay parameter.

According to the eighth possible implementation manner of the fourth aspect, in a ninth possible implementation manner, the anti-replay parameter includes: a start value Start and a fresh value Fresh; or, Count_C and/or Count_I generated according to a start value Start, and a fresh value Fresh; or, Count_C_small and/or Count_I_small dedicated to small data.

According to the fourth aspect or any one of the first to ninth possible implementation manners of the fourth aspect, in a tenth possible implementation manner, the parameter transfer module is further configured to:

before security processing is performed on the NAS PDU by using the security parameter and the security algorithm, receive an RRC Connection Setup message sent by the RNC, where the RRC Connection Setup message includes a security algorithm indicated by the RNC.

According to the fourth aspect or any one of the first to fourth possible implementation manners of the fourth aspect, in a tenth possible implementation manner, the apparatus further includes:

a configuration module, configured to: before security processing is performed on the NAS PDU by using the security parameter and the security algorithm, configure a security algorithm same as a small data security algorithm on the RNC as the security algorithm.

According to a fifth aspect, an embodiment of the present invention provides a data transmission apparatus, including:

a receiving module, configured to receive a non-access stratum protocol data unit NAS PDU that is sent by user equipment UE and has undergone security processing, where data to be transmitted is encapsulated in the NAS PDU; and a sending module, configured to send the NAS PDU to a Serving General Packet Radio Service Support Node SGSN.

In a first possible implementation manner of the fifth aspect, the security processing includes: security processing performed on the NAS PDU by using a security parameter and a security algorithm, where the security parameter includes: a cipher key CK_small and/or an integrity protection key IK_small; and the security algorithm includes: a cipher algorithm and/or an integrity protection algorithm.

According to the first possible implementation manner of the fifth aspect, in a second possible implementation manner, the apparatus further includes:

a negotiation module, configured to: before the NAS PDU that is sent by the UE and has undergone security processing is received, receive a security mode command SMC message sent by the SGSN, where the SMC message includes a random number Nonce generated by the SGSN; and send the SMC message including the random number Nonce to the UE, so that the UE acquires the security parameter according to the random number Nonce.

According to the first or second possible implementation manner of the fifth aspect, in a third possible implementation manner, the negotiation module is further configured to:

before the NAS PDU that is sent by the UE and has undergone security processing is received, receive, in a registration procedure of the UE, a message that is sent by the UE and includes a security algorithm supported by the UE, and send the message to the SGSN; and receive a message that is sent by the SGSN and includes a security algorithm indicated by the SGSN, and send the message to the UE.

According to the first or second possible implementation manner of the fifth aspect, in a fourth possible implementation manner, the negotiation module is further configured to:

before the NAS PDU that is sent by the UE and has undergone security processing is received, receive, in a procedure of an inter-SGSN handover of the UE, a relocation request Relocation Request message that is sent by a target SGSN and includes a security algorithm indicated by the target SGSN; and send a radio access network mobility information RAN Mobility information message to the UE, where the radio access network mobility information message includes the security algorithm indicated by the target SGSN.

According to the fifth aspect or any one of the first to fourth possible implementation manners of the fifth aspect, in a fifth possible implementation manner, the receiving module is specifically configured to:

receive an RRC Connection Setup Complete message sent by the UE, where the RRC Connection Setup Complete message carries the NAS PDU, a key set identifier KSI, and an anti-replay parameter; and the sending module is specifically configured to:

send the NAS PDU, the KSI, and the anti-replay parameter to the SGSN, where the KSI is used for enabling the SGSN to search for security context for deciphering the NAS PDU.

According to the fifth possible implementation manner of the fifth aspect, in a sixth possible implementation manner, the anti-replay parameter includes: a start value Start and a fresh value Fresh; or, Count_C and/or Count_I generated according to a start value Start, and a fresh value Fresh; or, Count_C_small and/or Count_I_small dedicated to small data.

According to the fifth possible implementation manner of the fifth aspect, in a seventh possible implementation manner, the apparatus further includes:

a parameter transfer module, configured to: before the RRC Connection Setup Complete message sent by the UE is received, receive an RRC connection request message sent by the UE, where the RRC connection request message includes a small data indication.

According to the first or second possible implementation manner of the fifth aspect, in an eighth possible implementation manner, the apparatus further includes:

a configuration module, configured to: before the NAS PDU that is sent by the UE and has undergone security processing is received, configure a security algorithm same as a small data security algorithm of the UE as the security algorithm.

According to the fifth aspect or any one of the first to fourth and the eighth possible implementation manners of the fifth aspect, in a ninth possible implementation manner, the apparatus further includes:

a processing module, configured to: before the NAS PDU is sent to the SGSN, decipher the NAS PDU.

According to the ninth possible implementation manner of the fifth aspect, in a tenth possible implementation manner, the security parameter response message further includes: a security algorithm selected by the SGSN.

According to the ninth or tenth possible implementation manner of the fifth aspect, in an eleventh possible implementation manner, the NAS PDU carried in the RRC Connection Setup Complete message is the NAS PDU that has undergone security processing performed by using the security algorithm, the security parameter, and an anti-replay parameter;

the RRC Connection Setup message further includes: the anti-replay parameter; and the processing module is specifically configured to:

decipher the NAS PDU by using the security algorithm, the security parameter, and the anti-replay parameter.

According to the eleventh possible implementation manner of the fifth aspect, in a twelfth possible implementation manner, the negotiation module is further configured to:

before the RRC Connection Setup message is sent to the UE, determine a security algorithm of current transmission; and the RRC Connection Setup message includes indication information of the security algorithm of current transmission determined by the RNC, the Fresh value, and the security algorithm supported by the LIE.

According to a sixth aspect, an embodiment of the present invention provides a data transmission apparatus, including:

a receiving module, configured to receive a non-access stratum protocol data unit NAS PDU sent by a radio network controller RNC, where the NAS PDU is sent by user equipment UE to the RNC after the UE performs security processing on the NAS PDU by using a security algorithm and a security parameter.

In a first possible implementation manner of the sixth aspect, the security parameter includes: a cipher key CK_small and/or an integrity protection key IK_small; and the security algorithm includes: a cipher algorithm and/or an integrity protection algorithm.

According to the first possible implementation manner of the sixth aspect, in a second possible implementation manner, the apparatus further includes:

a security parameter negotiation module, configured to: before the NAS PDU that is sent by the UE and has undergone security processing performed by using the security algorithm and the security parameter is received, negotiate with the UE to determine the security parameter.

According to the first or second possible implementation manner of the sixth aspect, in a third possible implementation manner, the apparatus further includes:

a security algorithm negotiation module, configured to: before the NAS PDU sent by the RNC is received, negotiate with the UE to determine the security algorithm.

According to the sixth aspect or any one of the first to third possible implementation manners of the sixth aspect, in a fourth possible implementation manner, the receiving module is specifically configured to:
receive a message that is sent by the RNC and includes the NAS PDU, where the NAS PDU is sent by the UE and received by the RNC and has undergone security processing performed by the UE by using the security algorithm and the security parameter; and
the apparatus further includes: a processing module, configured to decipher the NAS PDU.

According to the sixth aspect or any one of the first to third possible implementation manners of the sixth aspect, in a fifth possible implementation manner, the receiving module is specifically configured to:
receive a message that is sent by the RNC and includes the NAS PDU, where the NAS PDU is sent by the UE and received by the RNC, has undergone security processing performed by the UE by using the security algorithm and the security parameter, and has undergone deciphering by the RNC.

According to the fifth possible implementation manner of the sixth aspect, in a sixth possible implementation manner, the apparatus further includes: a parameter transfer module, configured to: before the NAS PDU that is sent by the UE and has undergone security processing performed by using the security algorithm and the security parameter is received, receive a security parameter acquisition request message sent by the RNC, where the security parameter acquisition request message includes a Key set identifier KSI of the UE and a small data indication; and
send a security parameter response message to the RNC, where the security parameter response message includes a security parameter corresponding to the Key set identifier.

According to the fifth or sixth possible implementation manner of the sixth aspect, in a seventh possible implementation manner,
the security parameter response message sent by the parameter transfer module to the RNC further includes: Count_C_small and/or Count_I_small dedicated to small data; and
the parameter transfer module is further configured to: after the message that is sent by the RNC and includes the NAS PDU is received, receive updated Count_C_small and/or Count_I_small dedicated to small data sent by the RNC.

The embodiments of the present invention provide a data transmission method and apparatus, where a small data packet to be transmitted is encapsulated into a NAS PDU, security processing is performed on the NAS PDU by using a security parameter and a security algorithm, and then the NAS PDU is directly carried in a message of control plane signaling for transmission, so that a process of establishing a data transmission channel by using multiple pieces of user plane signaling can be omitted, thereby greatly simplifying a procedure of data transmission, improving efficiency of data transmission, and further ensuring transmission security of data.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

"Small" in a small data packet in the embodiments of the present invention refers to a size of a data packet described from an application level, and the small data packet in the embodiments of the present invention is mainly about, for example, a data packet of an MTC device or keepalive information of a smart phone Smart Phone. For example, UE may determine, by using a threshold configured on a network side, whether a data packet that needs to be sent is a small data packet that meets a requirement of the present invention. When the network side indicates that a data packet smaller than 1000 bytes is a small data packet, if the UE sends a data packet smaller than 1000 bytes, a corresponding solution in the embodiments of the present invention is used.

Figure 1:
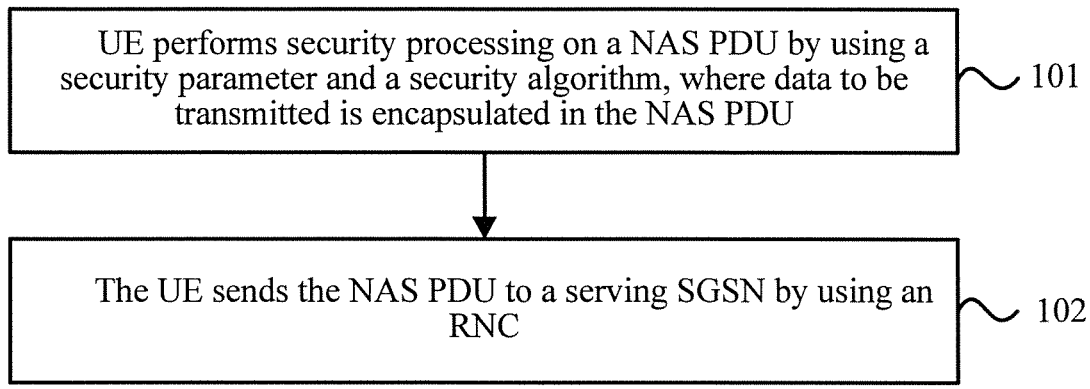
FIG. 1 is a flowchart of Embodiment 1 of a data transmission method according to the present invention.

FIG. 1 is a flowchart of Embodiment 1 of a data transmission method according to the present invention. This embodiment is executed by user equipment (User Equipment, UE for short), which may cooperate with the RNC in Embodiment 2 and the SGSN in Embodiment 3 to execute the data transmission method. In this embodiment, the UE encapsulates a small data packet to be transmitted into a non-access stratum protocol data unit (Non Access Stratum Protocol Data Unit, NAS PDU for short), performs security processing on the NAS PDU, and then sends the NAS PDU to a Serving General Packet Radio Service Support Node (Serving General Packet Radio Service Support Node, SGSN for short) by using a radio network controller (Radio Resource Controller, RNC for short), so as to transmit the small data packet. As shown in FIG. 1, the method in this embodiment may include:

Step 101: UE performs security processing on a NAS PDU by using a security parameter and a security algorithm, where data to be transmitted is encapsulated in the NAS PDU.

Step 102: The UE sends the NAS PDU to a serving SGSN by using an RNC.

In the prior art, a general process of data transmission is to establish a data transmission channel among a UE, an RNC, and an SGSN by using multiple pieces of signaling, and transmit data on the data transmission channel. However, in this embodiment of the present invention, in consideration of that data to be transmitted is a small data packet, the small data packet to be transmitted may be encapsulated into a NAS PDU, which may be directly carried in a message of control plane signaling for transmission.

In this embodiment, a small data packet to be transmitted is encapsulated into a NAS PDU, security processing is performed on the NAS PDU by using a security parameter and a security algorithm, and then the NAS PDU is directly carried in a message of control plane signaling for transmission, so that a process of establishing a data transmission channel by using multiple pieces of user plane signaling can be omitted, thereby greatly simplifying a procedure of data transmission, improving efficiency of data transmission, and further ensuring transmission security of data.

Further specifically, the security parameter may include: a cipher key CK_small and/or an integrity protection key IK_small; and
the security algorithm may include: a cipher algorithm and/or an integrity protection algorithm.

In an embodiment of the data transmission method of the present invention, before the performing, by UE, security processing on a NAS PDU by using a security parameter and a security algorithm, the method may further include:
negotiating, by the UE, with the SGSN to determine the security parameter.

Further specifically, the negotiating, by the UE, with the SGSN to determine the security parameter may include:
negotiating, by the UE, with the SGSN by performing an authentication and key agreement AKA process to determine the security parameter.

Further specifically, the negotiating, by the UE, with the SGSN by performing an AKA process to determine the security parameter may include:
negotiating, by the UE, with the SGSN by performing the AKA process to determine to use a cipher key CK in the AKA process as CK_small, and/or determine to use an integrity protection key IK in the AKA process as IK_small.

Alternatively, the negotiating, by the UE, with the SGSN by performing an AKA process to determine the security parameter may include:
negotiating, by the UE, with the SGSN by performing the AKA process to determine to use Formula (1) to acquire CK_small, and/or determine to use Formula (2) to acquire IK_small;

$$CK\_small = HMAC\text{-}SHA\text{-}256(A1, A2, \text{cipher label}) \quad (1)$$

$$IK\_small = HMAC\text{-}SHA\text{-}256(A1, A2, \text{integrity label}) \quad (2)$$

where HMAC-SHA-256 is a key generation function, A1 and A2 are input parameters of the key generation function HMAC-SHA-256, A1 is CK, or a new character string [CK||IK] obtained by joining character strings of CK and IK, A2 is a random number RAND in an authentication vector AV generated by an authentication center AuC in the AKA process, cipher label is a cipher algorithm label, and integrity label is an integrity protection algorithm label.

Alternatively, the negotiating, by the UE, with the SGSN to determine the security parameter may include:
receiving, by the UE in a security mode command SMC process, a random number Nonce sent by the SGSN; and
using, by the UE, Formula (1) to acquire CK_small, and/or determining to use Formula (2) to acquire IK_small,
where A2 is the random number Nonce.

In an embodiment of the data transmission method of the present invention, before the performing, by UE, security processing on a NAS PDU by using a security parameter and a security algorithm, the method may further include:
negotiating, by the UE, with the SGSN to determine the security algorithm.

Further specifically, the negotiating, by the UE, with the SGSN to determine the security algorithm may include:
negotiating, by the UE, with the SGSN by using a registration procedure of the UE to determine the security algorithm.

Further specifically, the negotiating, by the UE, with the SGSN by using a registration procedure of the UE to determine the security algorithm may include:
adding, by the UE, a security algorithm supported by the UE to a registration request Attach Request message or a routing area update request RAU Request message, and sending the registration request Attach Request message or the routing area update request RAU Request message to the SGSN; and receiving, by the UE, an SMC message sent by the SGSN, where the SMC message includes the security algorithm that is determined by the SGSN according to the security algorithm supported by the UE, or, receiving, by the UE, a registration accept Attach accept message or a routing area accept RAU accept message sent by the SGSN, where the registration accept Attach accept message or the routing area accept RAU accept message includes the security algorithm that is determined by the SGSN according to the security algorithm supported by the UE.

In actual implementation, a process of receiving, by the UE, an SMC message sent by the SGSN is that the SGSN sends an SMC message to the RNC, and then the RNC sends the SMC message to the UE.

Alternatively, the negotiating, by the UE, with the SGSN to determine the security algorithm may include:
negotiating, by the UE, with the SGSN by using a procedure of an inter-SGSN handover of the UE to determine the security algorithm.

Alternatively, the negotiating, by the UE, with the SGSN by using a procedure of an inter-SGSN handover of the UE to determine the security algorithm may include:
receiving, by the UE, a radio access network mobility information RAN Mobility information message sent by a target RNC in the inter-SGSN handover, where the radio access network mobility information message includes the security algorithm determined by a target SGSN in the inter-SGSN handover.

During actual implementation, a process of receiving, by the UE, a radio access network mobility information RAN Mobility information message sent by a target RNC in the inter-SGSN handover is that: the target SGSN selects a security algorithm, and then sends the security algorithm to the target RNC by using a relocation request Relocation Request, and the target RNC then transfers, by using the RAN Mobility information message, the security algorithm selected by the target SGSN to the UE.

Alternatively, the UE and the SGSN may use a security algorithm of a common service as a security algorithm of a small data service, that is, the negotiating, by the UE, with the SGSN to determine the security algorithm may include:
negotiating, by the UE, with the SGSN by using a service request Service Request process of the UE to determine a security algorithm of a service; and
negotiating, by the UE, with the SGSN to determine to use the security algorithm of the service as the security algorithm.

It should be noted that a service in the service request Service Request is a common service, for example, a short messaging service, a voice service, and a data service.

Further specifically, the negotiating, by the UE, with the SGSN by using a service request Service Request process of the UE to determine a security algorithm of a service may include:
receiving, by the UE, a security mode command SMC message sent by the RNC, where the SMC message carries the security algorithm of the service; and
after the negotiating, by the UE, with the SGSN to determine to use the security algorithm of the service as the security algorithm, the method includes:
saving, by the UE, the security algorithm; and
when the UE receives a next SMC message sent by the RNC, using a security algorithm of a service carried in the next SMC message as the security algorithm.

A security algorithm of a common service is updated each time a service takes place, and therefore, when a security algorithm of a common service is used as a security algorithm of a small data service, update of the security algorithm of the common service is still used for update of a security algorithm.

Various specific methods for transmitting small data after negotiation of the security parameter and the security algorithm are described below.

In an implementation solution, deciphering of the NAS PDU is implemented by the SGSN.
the sending, by the UE, the NAS PDU to an SGSN may include:
sending, by the UE, an RRC Connection Setup Complete message to the RNC, where the RRC Connection Setup Complete message carries the NAS PDU, so that the RNC sends the NAS PDU to the SGSN.

Further, before the sending, by the UE, an RRC Connection Setup Complete message to the RNC, the method may further include:
sending, by the UE, an RRC connection request message to the RNC, where the RRC connection request message includes a small data indication, so that the RNC and the SGSN trigger a procedure of transmitting small data.

Further, the RRC Connection Setup Complete message specifically includes: the NAS PDU and a key set identifier KSI, where the KSI is used for enabling the SGSN to search for security context for deciphering the NAS PDU.

In another implementation solution, deciphering of the NAS PDU is implemented by the RNC.

Before the performing, by UE, security processing on a NAS PDU by using a security parameter and a security algorithm, the method may further include:
configuring, on the UE, a security algorithm same as a small data security algorithm on the RNC as the security algorithm.

Further, the sending, by the UE, the NAS PDU to an SGSN may include:
sending, by the UE, an RRC Connection Setup Complete message to the RNC, where the RRC Connection Setup Complete message carries the NAS PDU, so that the RNC obtains the NAS PDU through deciphering and sends the NAS PDU to the SGSN.

Further, before the sending, by the UE, an RRC Connection Setup Complete message to the RNC, the method may further include:
receiving, by the UE, an RRC Connection Setup message sent by the RNC, where the RRC Connection Setup message includes a fresh value Fresh; and
the performing, by UE, security processing on a NAS PDU by using a security parameter and a security algorithm includes:
performing, by the UE, security processing on the NAS PDU by using the security parameter, the security algorithm, and the Fresh.

For example, in an embodiment of the data transmission method of the present invention, the UE generates Count_C and/or Count_I by using a start value Start saved in the UE, and Count_C and/or Count_I and a fresh value Fresh generated by the RNC are used as input parameters of a cipher algorithm and/or an integrity algorithm. Therefore, by using the foregoing method, the fresh value Fresh generated by the RNC may be transferred in the RRC Connection Setup message. After completing security processing on a NAS PDU, the UE may send the start value Start in use to the RNC, for example, send an RRC Connection Setup Complete message together with the NAS PDU that has undergone security processing, so that the RNC deciphers the NAS PDU.

Further, before the receiving, by the UE, an RRC Connection Setup message sent by the RNC, the method may further include:

sending, by the UE, an RRC connection request message to the RNC, where the RRC connection request message includes a small data indication and a KSI, so that the RNC sends the small data indication and the KSI to the SGSN.

Further, the performing, by UE, security processing on a NAS PDU by using a security parameter and a security algorithm may include:

performing, by the UE, security processing on the NAS PDU by using the security parameter, the security algorithm, and an anti-replay parameter; and the RRC Connection Setup Complete message sent by the UE to the RNC further carries the anti-replay parameter.

Specifically, the anti-replay parameter may include: a start value Start and a fresh value Fresh; or, Count_C and/or Count_I generated according to a start value Start, and a fresh value Fresh; or, Count_C_small and/or Count_I_small dedicated to small data.

During specific implementation, the RRC Connection Setup Complete message sent by the UE to the RNC may carry a start value Start and a serial number (Serial Number, SN for short), and the RNC may generate Count_C and/or Count_I according to Start and SN; or Count_C and/or Count_I may also be directly carried in the RRC Connection Setup Complete message; or, Count_C_small and/or Count_I_small separately maintained for a small data service may be carried.

Further, the RRC connection request message sent by the UE to the RNC further carries a first random number Nonce_UE generated by the UE;

the RRC Connection Setup message sent by the RNC and received by the UE further carries a second random number Nonce_RNC generated by the RNC; and the anti-replay parameter includes: the first random number Nonce_UE and the second random number Nonce_RNC.

During transmission of small data between the UE and the RNC each time, a NAS PDU is separately enciphered and deciphered only once in both uplink and downlink, and therefore anti-replay protection can be achieved. During transmission of small data each time, both the UE and the RNC need to generate a new first random number Nonce_UE and a new second random number Nonce_RNC and send the random numbers to each other. For a solution in which deciphering of a NAS PDU is implemented by an SGSN, after the RNC receives the first random number Nonce_UE sent by the UE, Nonce_UE and Nonce_RNC may be carried in one message and sent to the SGSN. The message for sending Nonce_UE and Nonce_RNC may be, for example, an initial UE (Initial UE) message, or may also be another message.

In a solution in which deciphering of the NAS PDU is implemented by the RNC, in an embodiment, the UE and the RNC may negotiate the security algorithm.

Before the performing, by UE, security processing on a NAS PDU by using a security parameter and a security algorithm, the method may further include:

receiving, by the UE, an RRC Connection Setup message sent by the RNC, where the RRC Connection Setup message includes a security algorithm indicated by the RNC.

Further, the RRC Connection Setup message received by the UE may further include: the fresh value Fresh generated by the RNC and the security algorithm supported by the UE.

Further, before the receiving, by the UE, an RRC Connection Setup message sent by the RNC, the method may further include:

sending, by the UE, an RRC connection request message to the RNC, where the RRC connection request message includes a small data indication, a KSI, and a security algorithm supported by the UE; and the security algorithm that is indicated by the RNC and included in the RRC Connection Setup message received by the UE is determined by the RNC according to the security algorithm supported by the UE.

Figure 2:
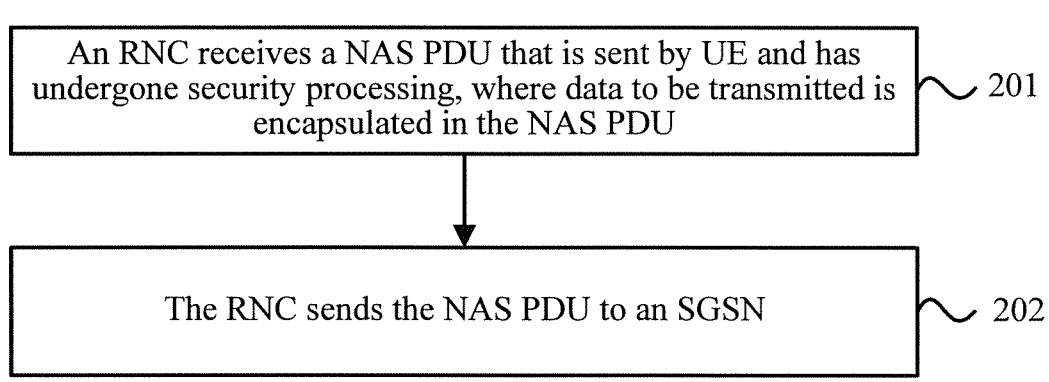
FIG. 2 is a flowchart of Embodiment 2 of a data transmission method according to the present invention.

FIG. 2 is a flowchart of Embodiment 2 of a data transmission method according to the present invention. This embodiment is executed by an RNC, which may cooperate with the UE in Embodiment 1 and the SGSN in Embodiment 3 to execute the data transmission method. This embodiment may include a scenario in which an RNC receives a NAS PDU sent by a UE, the NAS PDU is then directly forwarded to an SGSN, and the SGSN deciphers the NAS PDU, or may also include a scenario in which an RNC receives a NAS PDU sent by UE and deciphers the NAS PDU, and then sends the NAS PDU to the SGSN. As shown in FIG. 2, the method in this embodiment may include:

Step 201: An RNC receives a NAS PDU that is sent by UE and has undergone security processing, where data to be transmitted is encapsulated in the NAS PDU.

Step 202: The RNC sends the NAS PDU to an SGSN.

Specifically, in step 202, the RNC may skip processing on the NAS PDU and directly forward the received NAS PDU to the SGSN. In such a manner, the SGSN needs to decipher the NAS PDU, and therefore, an enciphering and deciphering function of the SGSN needs to be enhanced; the NAS PDU may also be deciphered and the NAS PDU obtained after the deciphering is then sent to the SGSN.

In this embodiment, an RNC receives, by using control plane signaling, a small data packet that is sent by UE and encapsulated into a NAS PDU and has undergone security processing, thereby greatly simplifying a procedure of data transmission, improving efficiency of data transmission, and further ensuring transmission security of data.

Specifically, the security processing may include: performing security processing on the NAS PDU by using a security parameter and a security algorithm, where the security parameter may include: a cipher key CK_small and/or an integrity protection key IK_small; and the security algorithm may include: a cipher algorithm and/or an integrity protection algorithm.

In an embodiment of the data transmission method of the present invention, before small data is transmitted, a security parameter may be negotiated first between the UE and the SGSN, so as to deter mine a security parameter for enciphering and deciphering in a transmission process, that is, a key. Specifically, before the receiving, by an RNC, a NAS PDU that is sent by UE and has undergone security processing, the method may further include:

receiving, by the RNC, a security mode command SMC message sent by the SGSN, where the SMC message includes a random number Nonce generated by the SGSN; and sending, by the RNC, where the SMC message includes the random number Nonce to the UE, so that the UE acquires the security parameter according to the random number Nonce.

Further, in an embodiment of the data transmission method of the present invention, before small data is transmitted, a security algorithm may be negotiated first between the UE and the SGSN, so as to determine a security algorithm in a transmission process, the security algorithm including an enciphering and deciphering algorithm UEA and/or an integrity protection algorithm UIA. Specifically, negotiation may be performed in a registration procedure of the UE, and before the receiving, by an RNC, a NAS PDU that is sent by UE and has undergone security processing, the method may further include:

receiving, by the RNC, in a registration procedure of the UE, a message that is sent by the UE and includes a security algorithm supported by the UE, and sending the message to the SGSN; and receiving, by the RNC, a message that is sent by the SGSN and includes a security algorithm indicated by the SGSN, and sending the message to the UE.

Alternatively, negotiation may be performed in a procedure of an inter-SGSN handover of the UE, and specifically, before the receiving, by an RNC, a NAS PDU that is sent by UE and has undergone security processing, the method further includes:

receiving, by the RNC in the procedure of the inter-SGSN handover of the UE, a relocation request Relocation Request message that is sent by a target SGSN and includes a security algorithm indicated by the target SGSN; and sending, by the RNC, a radio access network mobility information RAN Mobility information message to the UE, where the radio access network mobility information message includes the security algorithm indicated by the target SGSN.

In an embodiment, the enciphering and deciphering process is implemented by the SGSN, that is, an RNC receives a NAS PDU sent by a UE, and then directly forwards the NAS PDU to the SGSN; and the receiving, by an RNC, a NAS PDU that is sent by UE and has undergone security processing may include:

receiving, by the RNC, an RRC Connection Setup Complete message sent by the UE, where the RRC Connection Setup Complete message carries the NAS PDU, a key set identifier KSI, and an anti-replay parameter; and the sending, by the RNC, the NAS PDU to an SGSN includes:

sending, by the RNC, the NAS PDU, the KSI, and the anti-replay parameter to the SGSN, where the KSI is used for enabling the SGSN to search for security context for deciphering the NAS PDU.

Specifically, the anti-replay parameter may include: a start value Start and a fresh value Fresh; or, Count_C and/or Count_I generated according to a start value Start, and a fresh value Fresh; or, Count_C_small and/or Count_I_small dedicated to small data.

Further, before the receiving, by the RNC, an RRC Connection Setup Complete message sent by the UE, the method may further include:

receiving, by the RNC, an RRC connection request message sent by the UE, where the RRC connection request message includes a small data indication.

In another embodiment, the enciphering and deciphering process is implemented by the RNC, that is, after receiving a NAS PDU sent by a UE, an RNC first deciphers the NAS PDU and then sends the NAS PDU to the SGSN; and before the receiving, by an RNC, a NAS PDU that is sent by UE and has undergone security processing, the method may further include:

configuring, on the RNC, a security algorithm same as a small data security algorithm of the UE as the security algorithm.

That is, before the sending, by the RNC, the NAS PDU to the SGSN, the method may further include:

deciphering, by the RNC, the NAS PDU.

Further specifically, before the deciphering, by the RNC, the NAS PDU, the method may further include:

sending, by the RNC, a security parameter acquisition request message to the SGSN, where the security parameter acquisition request message includes a key set identifier KSI of the UE, or, the security parameter acquisition request message includes a KSI of the UE and a small data indication; and receiving, by the RNC, a security parameter response message sent by the SGSN, where the security parameter response message includes a security parameter corresponding to the KSI. Such a manner is suitable for a case in which an initial Start value is used in an anti-replay mechanism to generate an anti-replay parameter Count_C and/or Count_I.

If Count_C_small and/or Count_I_small separately maintained for a small data service is used in an anti-replay mechanism, the security parameter response message sent by the SGSN and received by the RNC needs to carry: a security parameter corresponding to the KSI and Count_C_small and/or Count_I_small dedicated to small data.

Specifically, the RNC may generate, according to Count_C_small and/or Count_I_small sent by the SGSN and in combination with an SN sent by the UE, Count_C_small and/or Count_C_small usable in current transmission, and decipher the NAS PDU by using Count_C_small and/or Count_I_small; moreover, after current transmission is complete, for example, after the sending, by the RNC, the NAS PDU to an SGSN, the method may further include: sending, by the RNC, the updated Count_C_small and/or Count_I_small dedicated to small data to the SGSN, so that the SGSN updates the Count_C_small and/or Count_I_small dedicated to small data.

In an embodiment, a preconfigured security algorithm may also be not used, and instead, for transmission each time, the UE negotiates a security algorithm with the RNC. Specifically, the security parameter response message may further include: a security algorithm selected by the SGSN.

During specific implementation, the security parameter acquisition request message may be an initial UE message, and the security parameter response message may be a command ID message or a Direct Transfer message, or, the security parameter acquisition request message may be an uplink information exchange request message, and the security parameter response message may be an uplink information exchange response message.

Further, before the receiving, by an RNC, a NAS PDU that is sent by UE and has undergone security processing, the method may further include:

sending, by the RNC, an RRC Connection Setup message to the UE, where the RRC Connection Setup message includes a fresh value Fresh;

the receiving, by an RNC, a NAS PDU that is sent by UE and has undergone security processing includes:

receiving, by the RNC, an RRC Connection Setup Complete message sent by the UE, where the RRC Connection Setup Complete message carries the NAS PDU that has undergone security processing performed by using the security algorithm, the security parameter, and the fresh value Fresh; and the deciphering, by the RNC, the NAS PDU includes:
deciphering, by the RNC, the NAS PDU by using the security algorithm, the security parameter, and the fresh value Fresh.

For example, in an embodiment of the data transmission method of the present invention, the UE generates Count_C and/or Count_I by using a start value Start saved in the UE, and Count_C and/or Count_I and a fresh value Fresh generated by the RNC are used as input parameters of a cipher algorithm and/or an integrity algorithm. Therefore, by using the foregoing method, the fresh value Fresh generated by the RNC may be transferred in the RRC Connection Setup message. After completing security processing on a NAS PDU, the UE may send the start value Start in use to the RNC, for example, send an RRC Connection Setup Complete message together with the NAS PDU that has undergone security processing, so that the RNC deciphers the NAS PDU.

Further, before the sending, by the RNC, an RRC Connection Setup message to the UE, the method may further include:
receiving, by the RNC, an RRC connection request message sent by the UE, where the RRC connection request message includes a small data indication and a KSI; or, the RRC Connection Setup Complete message sent by the UE and received by the RNC further includes: a KSI; and
the security parameter acquisition request message sent by the RNC to the SGSN carries the small data indication and the KSI, so as to enable the SGSN to search for security context of the NAS PDU.

Further, the NAS PDU carried in the RRC Connection Setup Complete message is the NAS PDU that has undergone security processing performed by using the security algorithm, the security parameter, and an anti-replay parameter;
the RRC Connection Setup message further includes: the anti-replay parameter; and
the deciphering, by the RNC, the NAS PDU may include:
deciphering, by the RNC, the NAS PDU by using the security algorithm, the security parameter, and the anti-replay parameter.

Specifically, the anti-replay parameter may include: a start value Start and a fresh value Fresh; or, Count_C and/or Count_I generated according to a start value Start, and a fresh value Fresh; or, Count_C_small and/or Count_I_small dedicated to small data.

Further, in the anti-replay mechanism, a first random number Nonce_UE and a second random number Nonce_RNC that are generated respectively by the UE and the RNC may be used as anti-replay parameters. Specifically, the RRC connection request message sent by the UE and received by the RNC may further carry the first random number Nonce_UE generated by the UE;
the RRC Connection Setup message sent by the RNC to the UE may further carry the second random number Nonce_RNC generated by the RNC; and
the anti-replay parameter may include: the first random number Nonce_UE and the second random number Nonce_RNC.

Further, before the sending, by the RNC, an RRC Connection Setup message to the UE, the method may further include:

determining, by the RNC, a security algorithm of current transmission; and
the RRC Connection Setup message sent by the RNC to the UE includes indication information of the security algorithm of current transmission determined by the RNC, the Fresh value, and the security algorithm supported by the UE.

During specific implementation, an RRC connection request message received by the RNC and sent by the UE may further include the security algorithm supported by the UE;
the security parameter response message received by the RNC and sent by the SGSN may further include a security algorithm supported by the SGSN;
the determining, by the RNC, a security algorithm of current transmission may include:
determining, by the RNC, the security algorithm of current transmission according to the security algorithm supported by the UE and the security algorithm supported by the SGSN; and
the RRC Connection Setup message sent by the RNC to the UE includes indication information of the security algorithm of current transmission determined by the RNC, the Fresh value, and the security algorithm supported by the UE.

Figure 3:
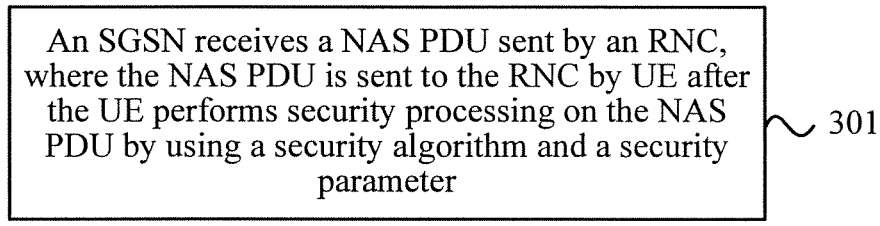
FIG. 3 is a flowchart of Embodiment 3 of a data transmission method according to the present invention.

FIG. 3 is a flowchart of Embodiment 3 of a data transmission method according to the present invention. This embodiment is executed by an SGSN, which may cooperate with the UE in Embodiment 1 and the RNC in Embodiment 2 to execute the data transmission method. In this embodiment, the SGSN receives a NAS PDU that is from UE and has undergone security processing performed by the UE, and a transmission process is that: the UE sends the NAS PDU that has undergone security processing to an RNC, and the RNC then sends the NAS PDU to the SGSN. This embodiment may include a scenario in which a NAS PDU is deciphered by the SGSN and a scenario in which a NAS PDU is deciphered by the RNC. As shown in FIG. 3, the method in this embodiment may include:

Step 301: An SGSN receives a NAS PDU sent by an RNC, where the NAS PDU is sent to the RNC by UE after the UE performs security processing on the NAS PDU by using a security algorithm and a security parameter.

Specifically, the NAS PDU received by the SGSN may have undergone deciphering by the RNC, or may also have not undergone deciphering by the RNC and instead is deciphered by the SGSN.

In this embodiment, an SGSN receives, by using control plane signaling, a NAS PDU that is from UE and forwarded by an RNC or is forwarded after deciphering by an RNC, and the NAS PDU is encapsulated with a small data packet and has undergone security processing, thereby greatly simplifying a procedure of data transmission, improving efficiency of data transmission, and further ensuring transmission security of data.

Specifically, the security parameter may include: a cipher key CK_small and/or an integrity protection key IK_small; and
the security algorithm may include: a cipher algorithm and/or an integrity protection algorithm.

In an embodiment of the data transmission method of the present invention, before the receiving, by an SGSN, a NAS PDU that is sent by UE and has undergone security processing performed by using a security algorithm and a security parameter, the method may further include:
negotiating, by the SGSN, with the UE to determine the security parameter.

Further specifically, the negotiating, by the SGSN, with the UE to determine the security parameter may include:
  negotiating, by the SGSN, with the UE by performing an authentication and key agreement AKA process to determine the security parameter.

Further specifically, the negotiating, by the SGSN, with the UE by using an AKA process to determine the security parameter may include:
  negotiating, by the SGSN, with the UE by performing the AKA process to determine to use a cipher key CK in the AKA process as CK_small, and/or determine to use an integrity protection key IK in the AKA process as IK_small.

Alternatively, the negotiating, by the SGSN, with the UE by using an AKA process to determine the security parameter may include:
  negotiating, by the SGSN, with the UE by performing the AKA process to determine to use Formula (1) to acquire CK_small, and/or determine to use Formula (2) to acquire IK_small;

$$CK\_small = HMAC\text{-}SHA\text{-}256(A1, A2, \text{cipher label}) \quad (1)$$

$$IK\_small = HMAC\text{-}SHA\text{-}256(A1, A2, \text{integrity label}) \quad (2)$$

where HMAC-SHA-256 is a key generation function, A1 and A2 are input parameters of the key generation function HMAC-SHA-256, A1 is CK, or a new character string [CK||IK] obtained by joining character strings of CK and IK, A2 is a random number RAND in an authentication vector AV generated by an authentication center AuC in the AKA process, cipher label is a cipher algorithm label, and integrity label is an integrity protection algorithm label.

Alternatively, the negotiating, by the SGSN, with the UE to determine the security parameter may include:
  sending, by the SGSN, a random number Nonce to the UE in a security mode command SMC process; and
  using, by the SGSN and the UE, Formula (1) to acquire CK_small, and/or determining to use Formula (2) to acquire IK_small,
  where A2 is the random number Nonce.

In an embodiment of the data transmission method of the present invention, before the receiving, by an SGSN, a NAS PDU sent by an RNC, the method may further include:
  negotiating, by the SGSN, with the UE to determine the security algorithm.

Further specifically, the negotiating, by the SGSN, with the UE to determine the security algorithm may include:
  negotiating, by the SGSN, with the UE by using a registration procedure of the UE to determine the security algorithm.

Further specifically, the negotiating, by the SGSN, with the UE by using a registration procedure of the UE to determine the security algorithm may include:
  receiving, by the SGSN, a registration request Attach request message or a routing area update request RAU Request message that is sent by the UE and includes a security algorithm supported by the UE; and
  sending, by the SGSN, a registration accept Attach Accept message or a routing area accept RAU accept message to the UE, where the registration accept Attach accept message or the routing area accept RAU accept message includes the security algorithm that is determined by the SGSN according to the security algorithm supported by the UE, or,
  sending, by the SGSN, an SMC message to the UE, where the SMC message includes the security algorithm that is determined by the SGSN according to the security algorithm supported by the UE.

In actual implementation, a process of receiving, by the UE, the SMC message sent by the SGSN is that the SGSN sends an SMC message to the RNC, and then the RNC sends the SMC message to the UE.

Alternatively, the negotiating, by the SGSN, with the UE to determine the security algorithm may include:
  negotiating, by the SGSN, with the UE by using a procedure of an inter-SGSN handover of the UE to determine the security algorithm.

Alternatively, the negotiating, by the SGSN, with the UE by using a procedure of an inter-SGSN handover of the UE to determine the security algorithm may include:
  receiving, by a target SGSN in the inter-SGSN handover, a forward relocation request message sent by a source SGSN, where the forward relocation request message includes a security algorithm determined by the source SGSN, the security parameter of the UE, and the security algorithm supported by the UE; and
  sending, by the target SGSN, a relocation request message to a target RNC, where the relocation request message includes the security algorithm determined by the target SGSN.

Alternatively, the negotiating, by the SGSN, with the UE to determine the security algorithm may include:
  negotiating, by the SGSN, with the UE by using a service request Service Request process of the UE to determine a security algorithm of a service; and
  negotiating, by the SGSN, with the UE to determine to use the security algorithm of the service as the security algorithm.

It should be noted that a service in the service request Service Request is a common service, for example, a short messaging service, a voice service, and a data service.

Alternatively, the negotiating, by the SGSN, with the UE by using a service request Service Request process of the UE to determine a security algorithm of a service may include:
  receiving, by the SGSN, a security mode command SMC complete message sent by the RNC, where the SMC complete message carries the security algorithm of the service; and
  after the negotiating, by the SGSN, with the UE to determine to use the security algorithm of the service as the security algorithm, the method includes:
  saving, by the SGSN, the security algorithm; and
  when the SGSN receives a next SMC complete message sent by the RNC, using a security algorithm of a service carried in the next SMC complete message as the security algorithm.

A security algorithm of a common service is updated each time a service takes place, and therefore, when a security algorithm of a common service is used as a security algorithm of a small data service, update of the security algorithm of the common service is still used for update of a security algorithm.

Various specific methods for transmitting small data after negotiation of the security parameter and the security algorithm are described below.

In an implementation solution, the receiving, by an SGSN, a NAS PDU that is sent by UE and has undergone security processing performed by using a security algorithm and a security parameter may include:
  receiving, by the SGSN, a message that is sent by the RNC and includes the NAS PDU, where the NAS PDU is sent by the UE and received by the RNC and has undergone security processing performed by the UE by using the security algorithm and the security parameter; and deciphering, by the SGSN, the NAS PDU.

Further specifically, the message that is sent by the RNC and received by the SGSN and includes the NAS PDU further carries a key set identifier KSI, where the KSI is used for enabling the SGSN to search for security context for deciphering the NAS PDU; and the deciphering, by the SGSN, the NAS PDU includes:
deciphering, by the SGSN, the NAS PDU by using the security context.

Further, the message that is sent by the RNC and received by the SGSN and includes the NAS PDU further carries an anti-replay parameter; and the deciphering, by the SGSN, the NAS PDU includes:
deciphering, by the SGSN, the NAS PDU by using the security context and the anti-replay parameter.

In another implementation solution, deciphering of the NAS PDU is implemented by the RNC.

Specifically, the receiving, by an SGSN, a NAS PDU sent by an RNC may include:

receiving, by the SGSN, a message that is sent by the RNC and includes the NAS PDU, where the NAS PDU is sent by the UE and received by the RNC, has undergone security processing performed by the UE by using the security algorithm and the security parameter, and has undergone deciphering by the RNC.

In an implementation manner, before the receiving, by an SGSN, a NAS PDU that is sent by UE and has undergone security processing performed by using a security algorithm and a security parameter, the method may further include:

receiving, by the SGSN, a security parameter acquisition request message sent by the RNC, where the security parameter acquisition request message includes a Key set identifier KSI of the UE and a small data indication; and sending, by the SGSN, a security parameter response message to the RNC, where the security parameter response message includes a security parameter corresponding to the Key set identifier.

In the foregoing implementation manner, for the anti-replay parameter, Count_C and/or Count_I generated by using a start value Start saved in the UE may be used, and a fresh value Fresh generated by the RNC may be combined. Therefore, the security parameter response message sent by the SGSN to the RNC does not need to include the anti-replay parameter.

In an implementation manner, the security parameter response message sent by the SGSN to the RNC may further include: a security algorithm selected by the SGSN.

In an implementation manner, the security parameter response message sent by the SGSN to the RNC may further include: Count_C_small and/or Count_I_small dedicated to small data; and after the receiving, by the SGSN, a message that is sent by the RNC and includes the NAS PDU, the method further includes: receiving, by the SGSN, updated Count_C_small and/or Count_I_small dedicated to small data sent by the RNC.

In the foregoing implementation manner, for the anti-replay parameter, Count_C_small and/or Count_I_small dedicated to small data may be used, and the two parameters Count_C_small and Count_I_small may be used as start values of the anti-replay parameter and saved on the SGSN. Therefore, during transmission of small data each time, the RNC needs to acquire the two parameters from the SGSN, and in combination with an SN, an anti-replay parameter usable for current data transmission is generated. Moreover, after data transmission is complete, the anti-replay parameter generated the current time needs to be returned to the SGSN, so that the SGSN updates Count_C_small and Count_I_small.

During specific implementation, the security parameter acquisition request message may be an initial UE message, and the security parameter response message may be a command ID message or a Direct Transfer message, or, the security parameter acquisition request message may be an uplink information exchange request message, and the security parameter response message may be an uplink information exchange response message.

The technical solutions of the data transmission method of the present invention are described in detail below by using several specific embodiments.

Figure 4:
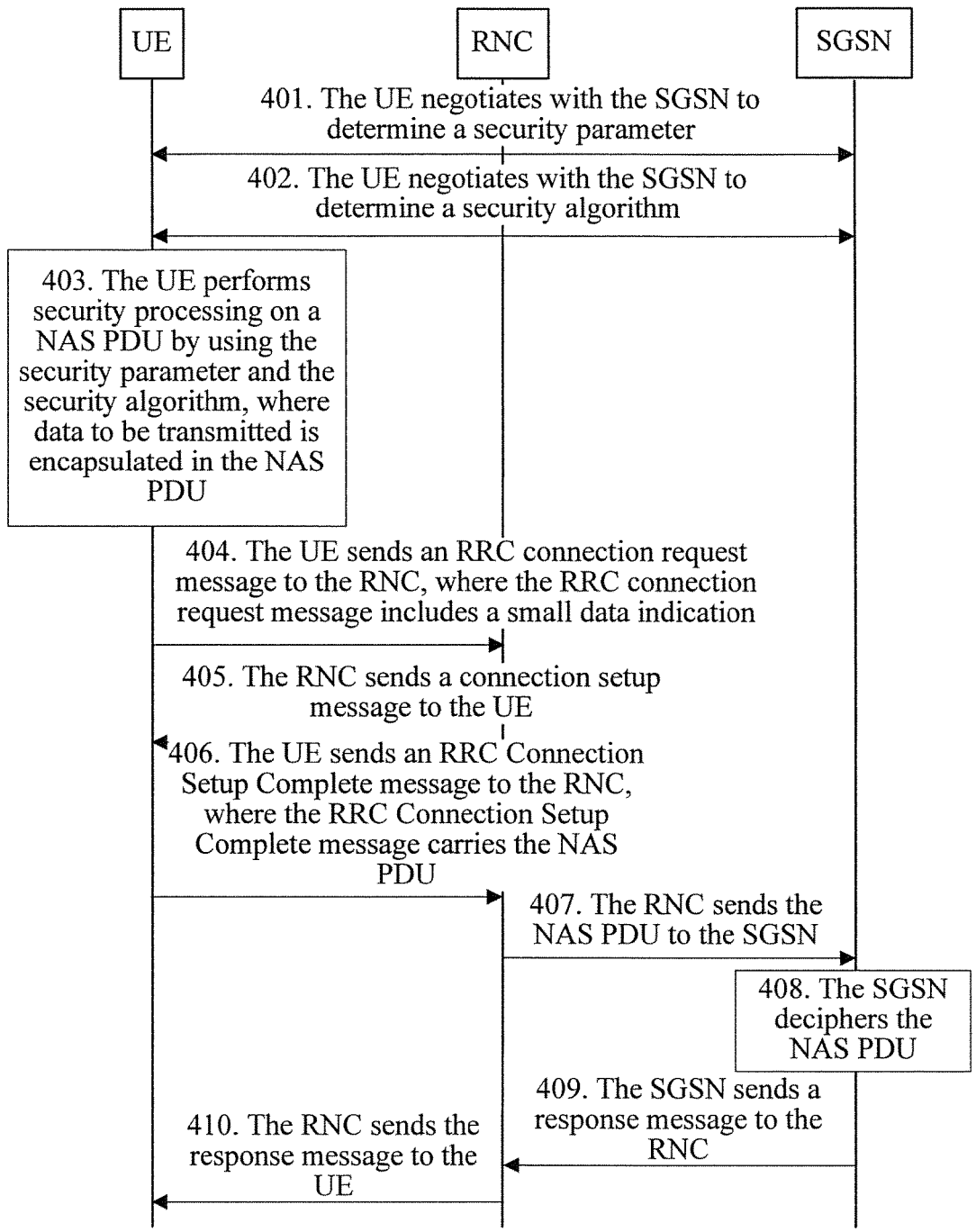
FIG. 4 is a signaling flowchart of Embodiment 4 of a data transmission method according to the present invention.

FIG. 4 is a signaling flowchart of Embodiment 4 of a data transmission method according to the present invention. A scenario in this embodiment is that deciphering of a NAS PDU or security processing of downlink data is executed by an SGSN. As shown in FIG. 4, the method in this embodiment may include:

Step 401: UE negotiates with an SGSN to determine a security parameter.

Before step 401, the UE may acquire a transmission resource by using a random access process.

Step 402: The UE negotiates with the SGSN to determine a security algorithm.

Step 403: The UE performs security processing on a NAS PDU by using the security parameter and the security algorithm, where data to be transmitted is encapsulated in the NAS PDU.

Specifically, the UE may perform security processing on the NAS PDU by using a security parameter (for example, a key), a security algorithm, and an anti-replay parameter saved by the UE.

The anti-replay parameter is used for implementing an anti-replay function, and the anti-replay function may be implemented in the following three manners:

Manner 1: Count_C and Count_I that are generated by using the start value Start saved in the UE, and a fresh value Fresh generated by an RNC, are used as the anti-replay parameter. In such a manner, Fresh sent by the RNC needs to be received before the UE performs security processing, and the UE needs to send a start value Start for generating Count_C and Count_I to the RNC, or directly send values of Count_C and Count_I to the RNC, while the RNC needs to send Start and Fresh to the SGSN, or send values of Count_C and Count_I and Fresh to the SGSN, so that the SGSN deciphers the data to be transmitted. A specific manner of sending the anti-replay parameter may be arranged flexibly. For example, the UE may add a Start value or values of Count_C and Count_I to a message for sending data to be transmitted for simultaneous sending, or may also send a Start value or values of Count_C and Count_I by using another message.

Manner 2: Count_C_small and Count_I_small that are separately maintained for small data are used as the anti-replay parameter. In such a manner, the RNC does not need to generate a fresh value Fresh, the UE needs to send Count_C_small and Count_I_small to the RNC, and the RNC also needs to send Count_C_small and Count_I_small to the SGSN.

Manner 3: A manner of using a random number Nonce value as the anti-replay parameter may be used. Specifically, the UE may generate a first random number Nonce_UE, and may add Nonce_UE to RRC Connection Request or RRC Connection Setup Complete; the RNC may generate a second random number Nonce_RNC, and add Nonce_RNC to RRC Connection Setup. When the UE performs security processing on the NAS PDU, Nonce_UE and Nonce_RNC are used as the anti-replay parameter. In such a manner, after receiving Nonce_UE sent by the UE, the RNC needs to send Nonce_UE and Nonce_RNC to the SGSN, so that the SGSN deciphers the data to be transmitted. For example, Nonce_UE and Nonce_RNC may be sent by using an initial UE message (Initial UE Message), or may also be sent by using another message.

Step 404: The UE sends an RRC connection request message to an RNC, where the RRC connection request message includes a small data indication.

The small data indication is used for informing the RNC that current transmission involves a small data service.

After receiving the RRC connection request message, the RNC may skip transmitting state information of CELL_DCH to the UE, and may also skip sending a measurement control signal.

Step 405: The RNC sends a connection setup message to the UE.

It should be noted that no time order exists between step 403 and steps 404 and 405, and step 403 only needs to be performed before step 406, where an exemplary solution is that step 403 is performed between step 405 and step 406.

During specific implementation, if a manner of using Count_C and Count_I generated by a start value Start and Fresh generated by the RNC is used in an anti-replay mechanism, step 404 may further include a fresh value Fresh generated by the RNC, and in such a manner, step 403 needs to be executed after step 404.

Step 406: The UE sends an RRC Connection Setup Complete message to the RNC, where the RRC Connection Setup Complete message carries the NAS PDU.

Specifically, the NAS PDU carried in the RRC Connection Setup Complete message (RRC Connection Setup Complete) message has undergone security processing in step 403. The RRC Connection Setup Complete message may further include a key set identifier (Key Set Identifier, KSI for short), so that after the RNC sends the KSI to the SGSN, the SGSN searches for security context for deciphering the NAS PDU.

Generally, the RRC Connection Setup Complete message further includes a bearer ID Bearer ID, an SN, and a message authentication code-identity (Message Authentication Code-Integrity, MAC-I for short). The Bearer ID is used for enabling the SGSN to map small data to a corresponding Bearer. The SN may be lower 4 bits of the anti-replay parameter Count and is used for enabling the SGSN to estimate, according to an anti-replay parameter Count saved in the SGSN and the SN, a correct value of the anti-replay parameter Count; or, the UE may also directly add a value of an entire anti-replay parameter Count to the RRC Connection Setup Complete message.

During specific implementation, step 406 may further include a start value Start used for generating anti-replay parameters Count_C and Count_I by the UE.

Step 407: The RNC sends the NAS PDU to the SGSN.

The message that includes the NAS PDU and is sent by the RNC to the SGSN in Step 407 may further carry Start and Fresh.

Specifically, the RNC may send the NAS PDU to the SGSN by using an initial UE message (Initial UE Message).

The Initial UE Message may further include a KSI and an anti-replay parameter. For example, in a manner in which a random number Nonce value may be carried as an anti-replay parameter for an anti-replay mechanism, a first random number Nonce_UE and a second random number Nonce_RNC may be carried in the Initial UE Message.

Generally, the initial UE Message further includes the UE identifier of the UE, for example, a packet temporary mobile subscriber identity (Packet Temporary Mobile Subscriber Identity, P-TMSI for short), a Bearer ID, an SN, and a MAC-I.

Step 408: The SGSN deciphers the NAS PDU.

Specifically, the SGSN may verify the integrity of the message by using security context of corresponding UE small data, and decipher the NAS PDU. Next, the NAS PDU may be further sent to a corresponding application server by using a serving gateway (Service Gateway, SGW for short) or a packet data network gateway (Packet Data Network (PDN) Gateway, PGW for short).

Step 409: The SGSN sends a response message to the RNC.

Step 409 and subsequent step 410 are a group of optional steps, and only need to be executed when downlink response data exists or an acknowledgment (ACK) message needs to be returned.

Specifically, when a downlink response message exists, the SGSN may also perform security processing on the response message, and then may send the response message to the RNC by using a Direct Transfer (Direct Transfer) message.

Step 410: The RNC sends the response message to the UE.

Specifically, an RRC Connection Release (RRC Connection Release) message may be used to return the response message to the UE.

In this embodiment, UE performs security processing on a NAS PDU by using a predetermined security parameter and security algorithm, and sends the NAS PDU to an RNC by using an RRC Connection Setup Complete message, the RNC forwards the NAS PDU to an SGSN, and the SGSN performs deciphering, so as to complete transmission of small data, and ensure transmission security of small data.

In the foregoing embodiment, the negotiating, by UE, with an SGSN to determine a security parameter in step 401 may be: negotiating, by the UE, with the SGSN by performing an authentication and key agreement AKA process to determine the security parameter.

Further specifically, the UE negotiates with the SGSN by performing the AKA process to determine to use a cipher key CK in the AKA process as CK_small, and/or determine to use an integrity protection key IK in the AKA process as IK_small.

In the foregoing embodiment, the negotiating, by UE, with an SGSN to determine a security parameter in step 401 may further be:

negotiating, by the UE, with the SGSN by performing the AKA process to determine to use Formula (1) to acquire CK_small, and/or determine to use Formula (2) to acquire IK_small;

$$CK\_small = HMAC\text{-}SHA\text{-}256(A1, A2, \text{cipher label}) \quad (1)$$

$$IK\_small = HMAC\text{-}SHA\text{-}256(A1, A2, \text{integrity label}) \quad (2)$$

where HMAC-SHA-256 is a key generation function, A1 and A2 are input parameters of the key generation function HMAC-SHA-256, A1 is CK, or a new character string [CK||IK] obtained by joining character strings of CK and IK, A2 is a random number RAND in an authentication vector AV generated by an authentication center AuC in the AKA process, cipher label is a cipher algorithm label, and integrity label is an integrity protection algorithm label. The label may be in a form of an ASCII character string. The life cycles of CK_small and IK_small depend on life cycles of IK and CK.

During specific implementation, RAND may be a RAND value included in an authentication vector AV (Authentication Vector)=(RAND, XRES, CK, IK, AUTN) that is generated by a home environment (Home Environment, HE for short) or a home location register (Home location Register, HLR for short) when the UE and a network side perform the AKA process.

In the foregoing embodiment, the negotiating, by UE, with an SGSN to determine a security parameter in step 401 may further be:

receiving, by the UE, in a first security mode command SMC process after the AKA process is ended, a random number Nonce sent by the SGSN; and using, by the UE, Formula (1) to acquire CK_small, and/or determining to use Formula (2) to acquire IK_small, where A2 is the random number Nonce. Nonce is a Nonce value that is generated by the SGSN after the UE and the network side perform AKA, and may be sent to the UE by using a first SMC message.

Figure 5:
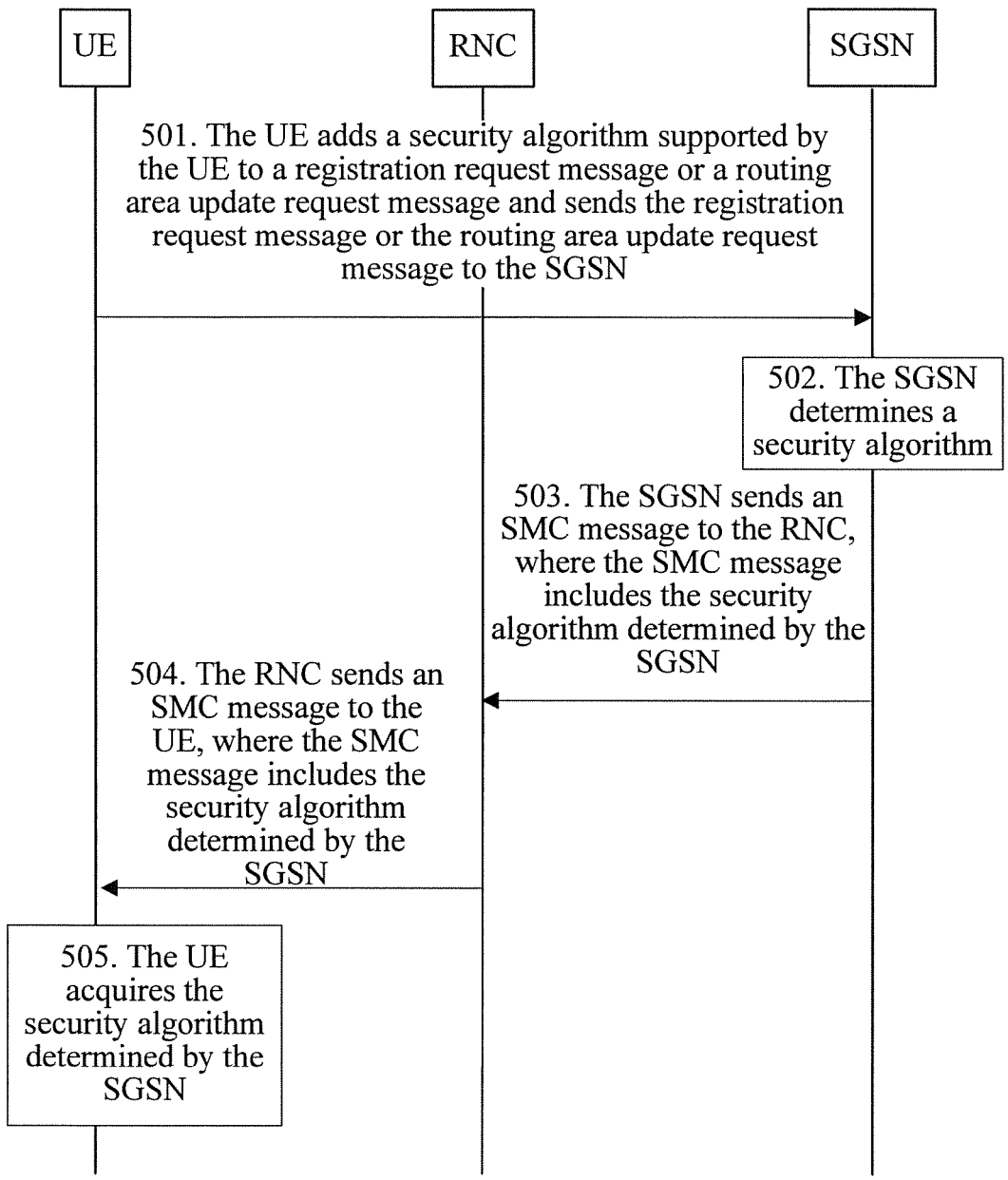
FIG. 5 is a signaling flowchart of Manner 1 of negotiating a security algorithm in Embodiment 4 of a data transmission method according to the present invention.

FIG. 5 is a signaling flowchart of Manner 1 of negotiating a security algorithm in Embodiment 4 of a data transmission method according to the present invention. In this embodiment, UE negotiates with an SGSN by using a registration procedure of the UE to determine a security algorithm. When the UE is connected to a network, or performs routing area update (Routing Area Update, RAU for short) in an idle mode, or changes from an idle mode idle to a connected mode connected, or the UE is switched from another system to a Universal Terrestrial Radio Access Network (Universal Terrestrial Radio Access Network, UTRAN for short), the UE needs to perform algorithm negotiation with a network side. The network side may send a security algorithm of a small data service to the UE by using an extended SMC message, or a connection accept (Attach Accept) message, or a routing area update accept (RAU Accept) message. As shown in FIG. 5, the method in this embodiment may include:

Step 501: UE adds a security algorithm supported by the UE to a registration request message or a routing area update request message, and sends the registration request message or the routing area update request message to the SGSN.

The registration request Attach Request message or the routing area update request RAU Request message may further include a UE identifier, for example, a P-TMSI of the UE. The security algorithm supported by the UE is a UE small data security capability (UE small data security capability).

Step 502: The SGSN determines a security algorithm.

The security algorithm herein is a security algorithm of a small data service. Specifically, the SGSN may select, according to an algorithm priority list and the security algorithm supported by the UE, an optimal security algorithm as the security algorithm of the small data service, for example, a selected small data enciphering and deciphering algorithm selected UEA_small, or a selected small data integrity protection algorithm selected UIA_small.

Step 503: The SGSN sends an SMC message to an RNC, where the SMC message includes the security algorithm determined by the SGSN.

The SMC message sent by the SGSN to the RNC may further include the security algorithm supported by the UE.

Step 504: The RNC sends an SMC message to the UE, where the SMC message includes the security algorithm determined by the SGSN.

During specific implementation, the extended SMC message in the two steps may further include the security algorithm supported by the UE as reported by the UE, so as to acknowledge that the security algorithm is not changed.

Step 505: The UE acquires the security algorithm determined by the SGSN.

Specifically, the UE verifies the integrity of the SMC message, and saves the security algorithm, selected UEA_small or selected UIA_small, determined by the SGSN.

In this embodiment, UE negotiates with an SGSN by using a registration procedure to determine a security algorithm of a small data service.

In the foregoing embodiment, the SGSN sends, to the UE, the security algorithm determined by the SGSN, or may also send the security algorithm by using a registration accept Attach accept message or a routing area accept RAU accept message, where the registration accept Attach accept message or the routing area accept RAU accept message includes the security algorithm that is determined by the SGSN according to the security algorithm supported by the UE.

Figure 6:
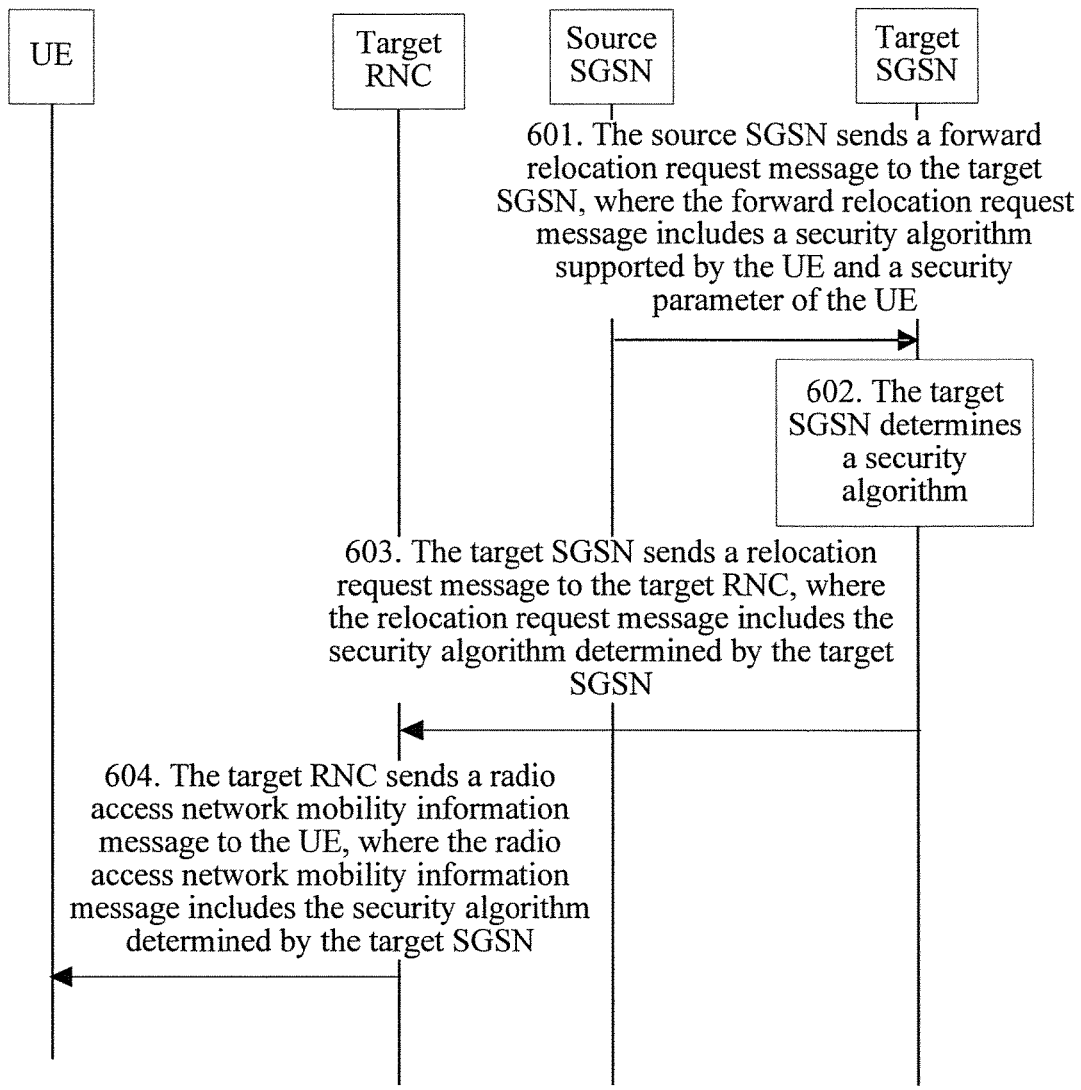
FIG. 6 is a signaling flowchart of Manner 2 of negotiating a security algorithm in Embodiment 4 of a data transmission method according to the present invention.

FIG. 6 is signaling flowchart of Manner 2 of negotiating a security algorithm in Embodiment 4 of a data transmission method according to the present invention. In this embodiment, UE negotiates with an SGSN by using a procedure of an inter-SGSN handover of the UE to determine a security algorithm.

In a handover process, if the UE performs a handover in a same SGSN, the security algorithm is unchanged, and algorithm negotiation is not required; if the UE performs inter-SGSN handover (inter-SGSN relocation), an algorithm selected by a target SGSN may be sent to the UE by using a handover procedure signaling relocation request (Relocation Request) and radio access network mobility information (RAN Mobility information).

As shown in FIG. 6, the method in this embodiment may include:

Step 601: A source SGSN sends a forward relocation request message to a target SGSN, where the forward relocation request message includes a security algorithm supported by UE and a security parameter of the UE.

During specific implementation, the forward relocation request (Forward Relocation Request) message may further include: a security algorithm determined by the source SGSN.

Step 602: The target SGSN determines a security algorithm.

Specifically, the target SGSN may reselect, according to an algorithm priority list supported by the target SGSN, selected UEA_small and selected UIA_small of the target SGSN, and a security algorithm reselected by the target SGSN may be the same as or may also be different from the security algorithm determined by the source SGSN.

Step 603: The target SGSN sends a relocation request message to a target RNC, where the relocation request message includes the security algorithm determined by the target SGSN.

Step 604: The target RNC sends a radio access network mobility information message to the UE, where the radio access network mobility information message includes the security algorithm determined by the target SGSN.

In this embodiment, UE negotiates with an SGSN by using a procedure of an inter-SGSN handover to determine a security algorithm of a small data service.

Figure 7:
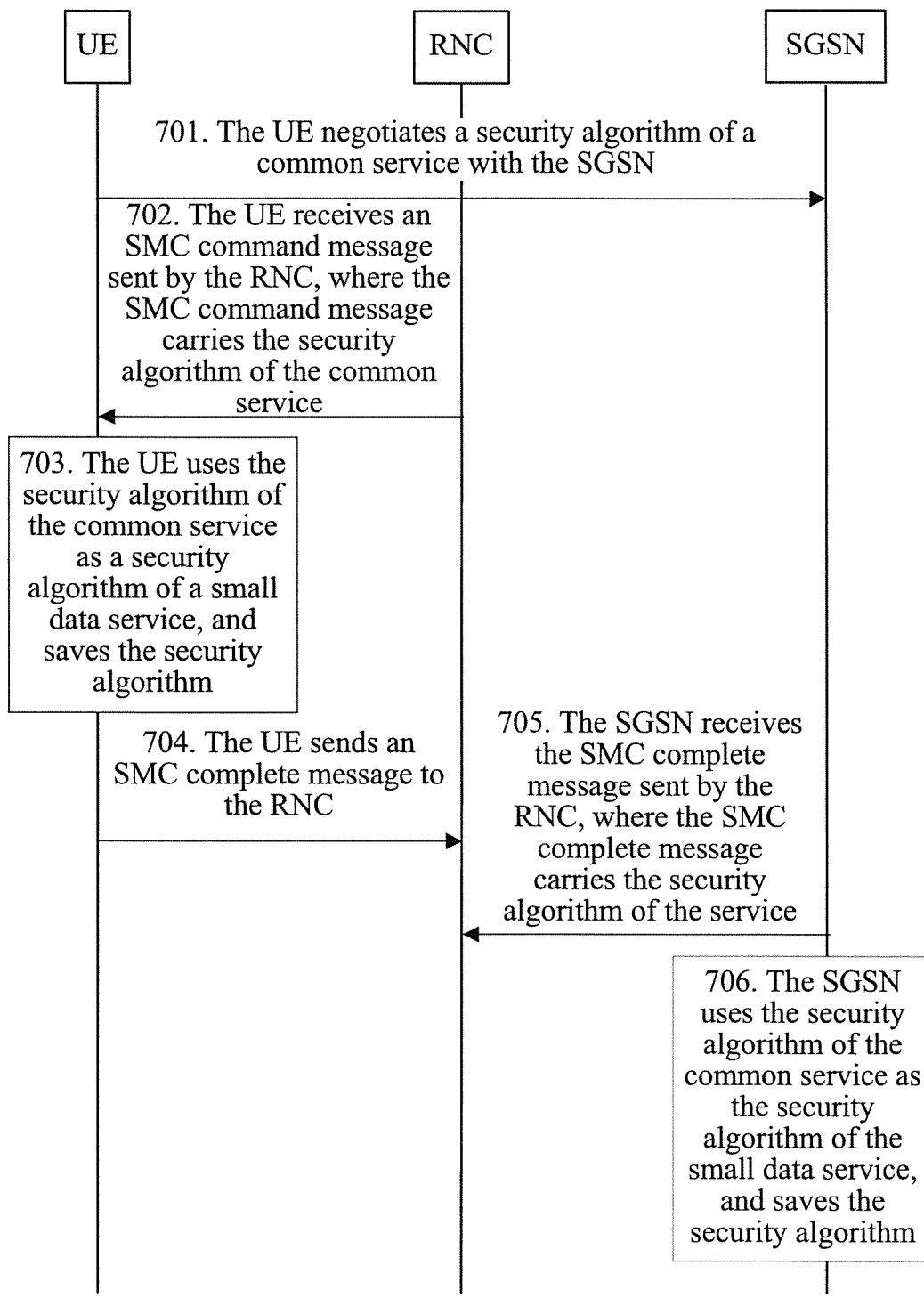
FIG. 7 is a signaling flowchart of Manner 3 of negotiating a security algorithm in Embodiment 4 of a data transmission method according to the present invention.

FIG. 7 is a signaling flowchart of Manner 3 of negotiating a security algorithm in Embodiment 4 of a data transmission method according to the present invention. In this embodiment, an SGSN negotiates with UE to determine to use a security algorithm of a service as a security algorithm. When the UE has a common service, the UE initiates a service request (Service Request) process, and negotiates a security algorithm of the common service with an RNC. In a process of negotiating a small data security algorithm in such a manner, the negotiation of a security algorithm of the common service between the UE and the SGSN may be unchanged. After the negotiation of the security algorithm of the common service is complete, the UE and the SGSN separately saves the security algorithm of the common service as a security algorithm of a small data service. As shown in FIG. 7, the method in this embodiment may include:

Step 701: UE negotiates a security algorithm of a common service with an SGSN.

Step 702: The UE receives an SMC command message sent by an RNC, where the SMC command message carries the security algorithm of the common service.

Step 703: The UE uses the security algorithm of the common service as a security algorithm of a small data service, and saves the security algorithm.

The UE may update the security algorithm when receiving an SMC command message including a security algorithm of a new common service next time.

Step 704: The UE sends an SMC complete message to the RNC.

Step 705: The SGSN receives the SMC complete message sent by the RNC, where the SMC complete message carries the security algorithm of the service.

Step 706: The SGSN uses the security algorithm of the common service as the security algorithm of the small data service, and saves the security algorithm.

The SGSN may update the security algorithm when receiving an SMC complete message including a security algorithm of a new common service next time.

In this embodiment, the SGSN negotiates with the UE to determine to use the security algorithm of the service as the security algorithm.

Figure 8:
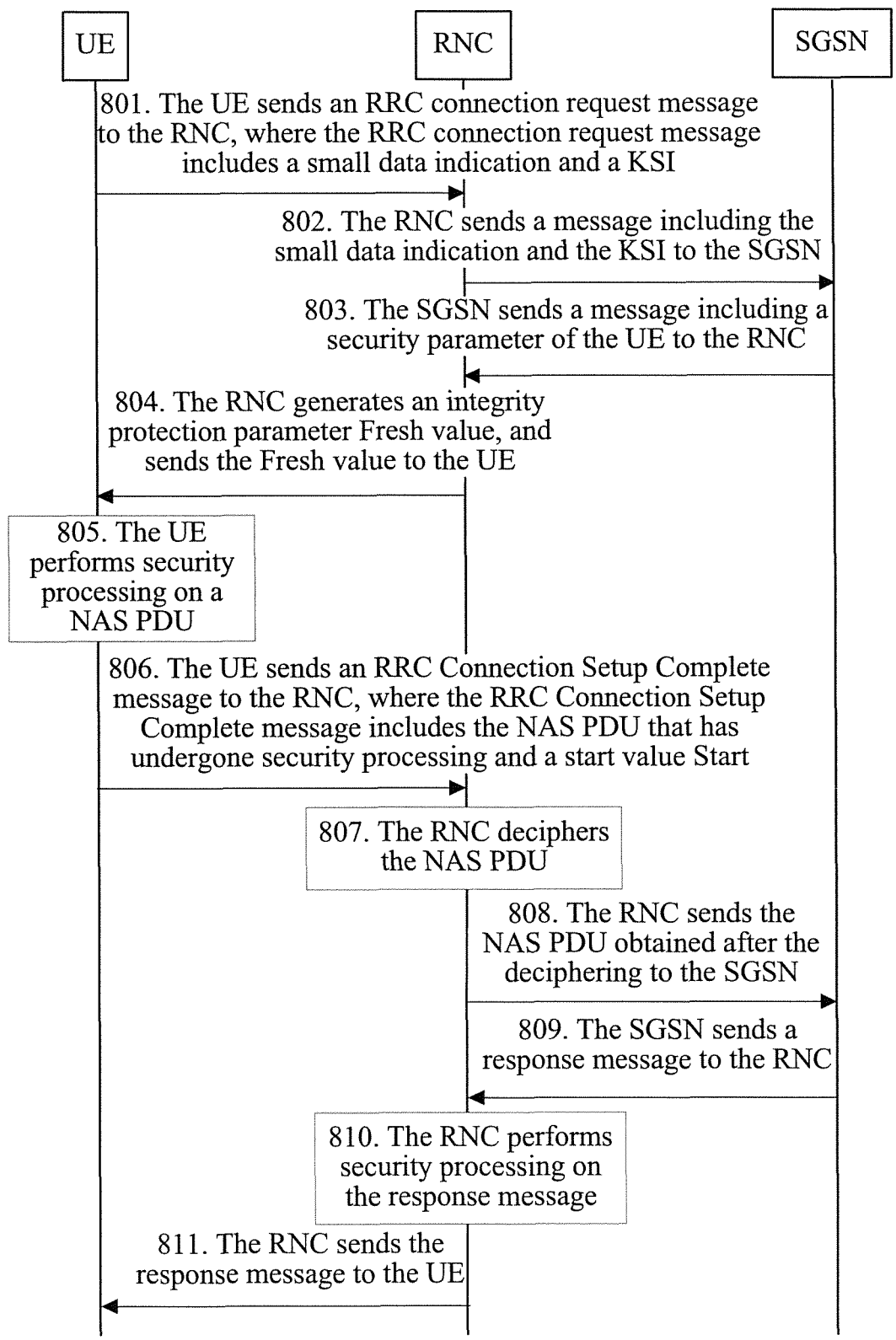
FIG. 8 is a signaling flowchart of Embodiment 5 of a data transmission method according to the present invention.

FIG. 8 is a signaling flowchart of Embodiment 5 of a data transmission method according to the present invention. A scenario in this embodiment is that deciphering of a NAS PDU or security processing of downlink data is executed by an RNC, and a security algorithm is preconfigured on UE and the RNC. As shown in FIG. 8, the method in this embodiment may include:

Step 801: UE sends an RRC connection request message to an RNC, where the RRC connection request message includes a small data indication and a KSI.

The small data indication is used for informing the RNC that current transmission involves a small data service, and the KSI is used for enabling an SGSN to search for security context of small data to be transmitted.

Step 802: The RNC sends a message including the small data indication and the KSI to an SGSN.

Specifically, a message including the small data indication and the KSI may further include a UE identifier P-TMSI of the UE, which is used for acquiring a security parameter corresponding to the UE. The message may be an initial UE message, or an uplink information exchange request (Uplink Information Exchange Request) message, or may also be another message.

Step 803: The SGSN sends a message including a security parameter of the UE to the RNC.

Specifically, the SGSN may search, according to the KSI, for security parameters CK_small and IK_small corresponding to the UE, and then send the security parameters to the RNC. The security parameters may be sent to the RNC by using a Common ID (Common ID) message or a Direct Transfer (Direct Transfer) message, where the message may also be an uplink information exchange response (Uplink Information Exchange Response) message (which is used in pair with the uplink information exchange request message in step 802), or may also be another message.

Step 804: The RNC generates an integrity protection parameter Fresh value, and sends the Fresh value to the UE.

Specifically, the Fresh value may be sent by using an RRC Connection Setup message.

Step 805: The UE performs security processing on a NAS PDU.

Specifically, the UE may use the security parameters CK_small and IK_small, preset security algorithms selected UEA_small and selected UIA_small, and an anti-replay parameter to encipher a NAS PDU encapsulated with data to be transmitted.

The anti-replay parameter is to implement an anti-replay function, and the anti-replay function may be implemented in the following three manners:

Manner 1: Count_C and Count_I that are generated by using the start value Start saved in the UE, and a fresh value Fresh generated by an RNC, are used as the anti-replay parameter. In such a manner, Fresh sent by the RNC needs to be received before the UE performs security processing, and the UE needs to send a start value Start for generating Count_C and Count_I to the RNC, or directly send values of Count_C and Count_I to the RNC, while the RNC needs to send Start and Fresh to the SGSN, or send values of Count_C and Count_I and Fresh to the SGSN, so that the SGSN deciphers the data to be transmitted. A specific manner of sending the anti-replay parameter may be arranged flexibly. For example, the UE may add a Start value or values of Count_C and Count_I to a message for sending data to be transmitted for simultaneous sending, or may also send a Start value or values of Count_C and Count_I by using another message.

Manner 2: Count_C_small and Count_I_small that are separately maintained for small data are used as the anti-replay parameter. In such a manner, the RNC does not need to generate a fresh value Fresh, the UE needs to send Count_C_small and Count_I_small to the RNC, and after executing an enciphering and deciphering operation, the RNC also needs to send the updated Count_C_small and Count_I_small to the SGSN.

Manner 3: A manner of using a random number Nonce value as the anti-replay parameter may be used. Specifically, the UE may generate a first random number Nonce_UE, and may add Nonce_UE to RRC Connection Request or RRC Connection Setup Complete; the RNC may generate a second random number Nonce_RNC, and add Nonce_RNC to RRC Connection Setup. When the UE performs security processing on the NAS PDU, Nonce_UE and Nonce_RNC are used as the anti-replay parameter. In such a manner, after receiving Nonce_UE sent by the UE, the RNC may use Nonce_UE and Nonce_RNC as the anti-replay parameter to decipher the data to be transmitted.

In this embodiment, the anti-replay mechanism in Manner 1 is used as an example for description. When the anti-replay mechanisms in the rest two manners are used, the parameter that needs to be carried in each message is correspondingly changed according to a demand of each manner.

Moreover, the UE may further generate a MAC-I.

Step 806: The UE sends an RRC Connection Setup Complete message to the RNC, where the RRC Connection Setup Complete message includes the NAS PDU that has undergone security processing and a start value Start.

Specifically, the RRC Connection Setup Complete message may include a parameter needed for deciphering, for example, an anti-replay parameter, a Bearer ID, and a MAC-I.

Step 807: The RNC deciphers the NAS PDU.

Specifically, step 807 may further include performing an operation such as integrity check on the NAS PDU.

Step 808: The RNC sends the NAS PDU obtained after the deciphering to the SGSN.

Specifically, the RNC may send the NAS PDU by using a Direct Transfer (Direct Transfer) message, and the Direct Transfer message may further include a Bearer ID.

Step 809: The SGSN sends a response message to the RNC.

Step 809 and subsequent step 810 are a group of optional steps, and only need to be executed when downlink response data exists or an acknowledgment (ACK) message needs to be returned.

Specifically, when a downlink response message exists, the SGSN may send the downlink response message to the RNC by using a Direct Transfer message.

Step 810: The RNC performs security processing on the response message.

Specifically, a same security parameter may be used to perform security processing on the response message, or a specific security parameter may also be changed. If a specific security parameter is changed, for example, an anti-replay parameter is changed, the UE needs to be informed in a subsequent step.

Moreover, if an anti-replay parameter is used as an anti-replay parameter separately maintained for small data, and the anti-replay parameter is updated in step 810, the updated anti-replay parameter further needs to be returned to the SGSN, and a Direct Transfer (Direct Transfer) message may be used for transfer.

Step 811: The RNC sends the response message to the UE.

Specifically, an RRC Connection Release (RRC Connection Release) message may be used to return the response message to the UE.

In this embodiment, a procedure of transmitting small data in a scenario in which an RNC deciphers a small data packet is provided. UE performs security processing on data to be transmitted, and the RNC performs deciphering and sends the small data packet obtained after the deciphering to an SGSN, so as to complete transmission of small data, and ensure transmission security of small data.

In the foregoing embodiment, if an algorithm is not preconfigured on UE and an RNC, and instead the UE negotiates a security algorithm with an SGSN in a registration process, in step 803, the negotiated security algorithm may be carried in a message that is sent by the SGSN to the RNC and includes a security parameter of the UE.

Figure 9:
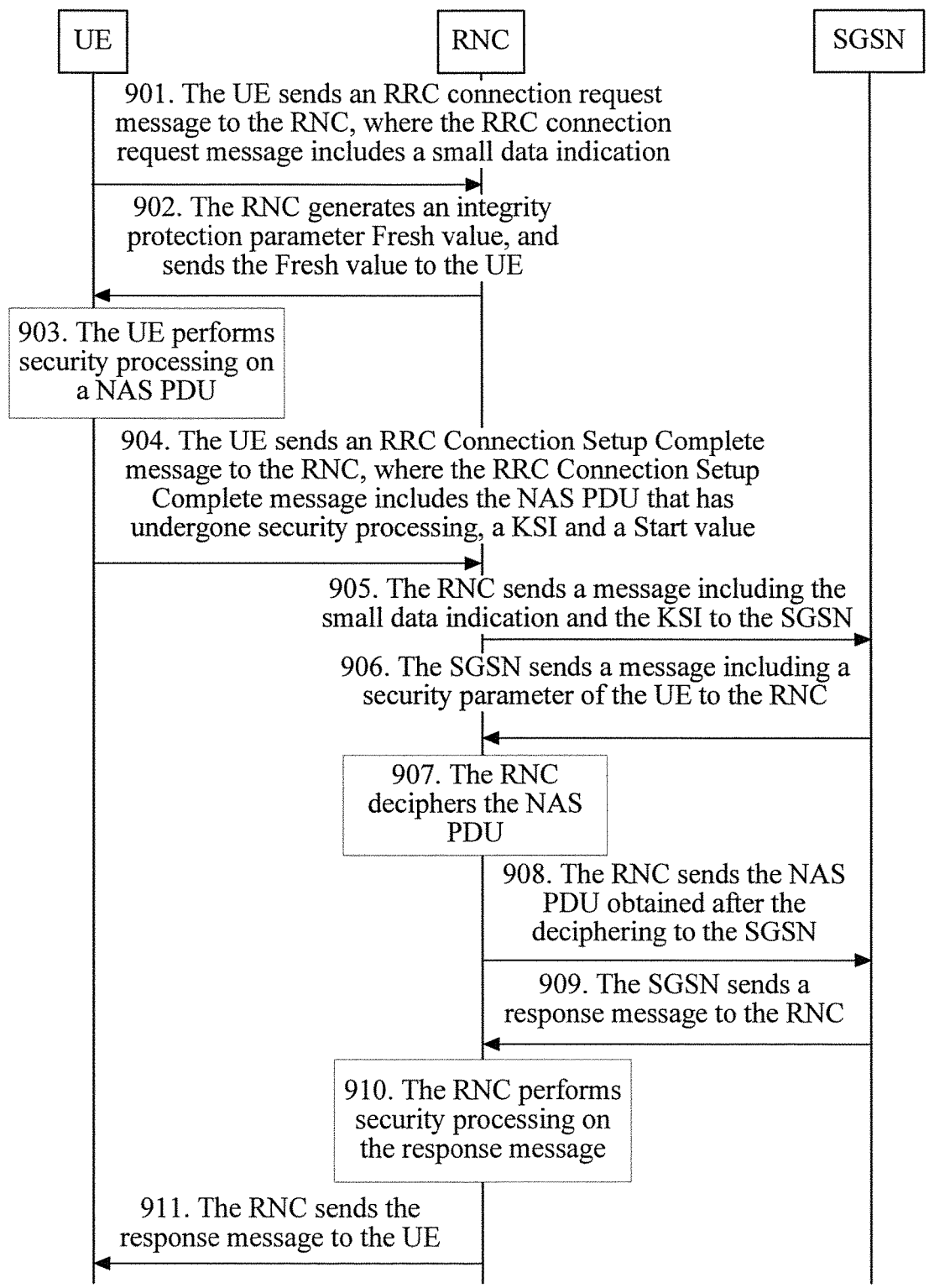
FIG. 9 is a signaling flowchart of Embodiment 6 of a data transmission method according to the present invention.

FIG. 9 is a signaling flowchart of Embodiment 6 of a data transmission method according to the present invention. A scenario in this embodiment is that deciphering of a NAS PDU or security processing of downlink data is executed by an RNC, and a security algorithm is preconfigured on UE and the RNC. A difference between this embodiment and the embodiment shown in FIG. 8 lies in that: In the embodiment shown in FIG. 8, the RNC interacts with an SGSN in an RRC process, and a delay in data transmission is relatively short; however, a big change occurs in the solution in the embodiment as compared with a signaling procedure in the prior art, and a signaling order needs to be adjusted; in this embodiment, a time order in an existing signaling procedure is not changed and implementation becomes simpler; however, a delay in data transmission is longer as compared with the embodiment shown in FIG. 8. As shown in FIG. 9, the method in this embodiment may include:

Step 901: UE sends an RRC connection request message to an RNC, where the RRC connection request message includes a small data indication.

Step 902: The RNC generates an integrity protection parameter Fresh value, and sends the Fresh value to the UE.

Step 903: The UE performs security processing on a NAS PDU.

Step 904: The UE sends an RRC Connection Setup Complete message to the RNC, where the RRC Connection Setup Complete message includes the NAS PDU that has undergone security processing, a KSI, and a Start value.

It is only one implementation manner to place the KSI in the RRC Connection Setup Complete message in step 904 for transfer. The KSI may also be placed in the RRC connection request message in step 901 for transfer.

Step 905: The RNC sends a message including the small data indication and the KSI to the SGSN.

Step 906: The SGSN sends a message including a security parameter of the UE to the RNC.

Step 907: The RNC deciphers the NAS PDU.

Step 908: The RNC sends the NAS PDU obtained after the deciphering to the SGSN.

Step 909: The SGSN sends a response message to the RNC.

Step 910: The RNC performs security processing on the response message.

Step 911: The RNC sends the response message to the UE.

In this embodiment, a procedure of transmitting small data in a scenario in which an RNC deciphers a small data packet is provided. UE performs security processing on data to be transmitted, and the RNC performs deciphering and sends the small data packet obtained after the deciphering to an SGSN, so as to complete transmission of small data, and ensure transmission security of small data.

The foregoing embodiment is described by using an example of a manner in which for an anti-replay mechanism, Count_C and Count_I generated by using a start value Start saved in a UE, and a fresh value Fresh generated by an RNC, are used as an anti-replay parameter; for the anti-replay mechanism, in one manner, Count_C_small and Count_I_small that are separately maintained for small data may also be used as an anti-replay parameter, or, in another manner, a random number Nonce value may be used as an anti-replay parameter. When the anti-replay mechanism in the other two manners are used, the parameter that needs to be carried in each message is correspondingly changed according to a demand of each manner, and for a specific implementation manner, reference may be made to the description in Embodiment 5.

Figure 10:
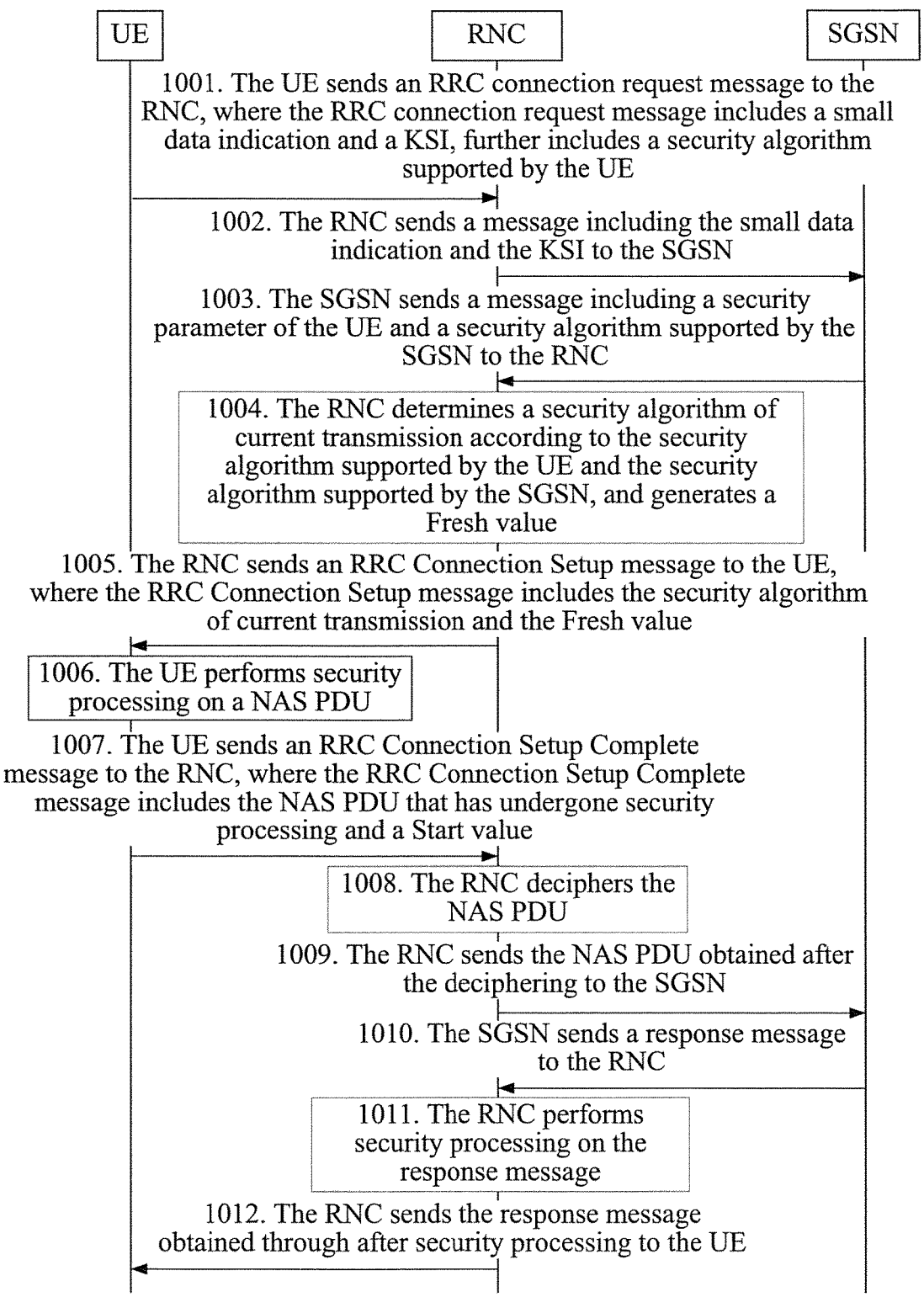
FIG. 10 is a signaling flowchart of Embodiment 7 of a data transmission method according to the present invention.

FIG. 10 is a signaling flowchart of Embodiment 7 of a data transmission method according to the present invention. A scenario in this embodiment is that deciphering of a NAS PDU or security processing of downlink data is executed by an RNC, and in a process of transmission of small data each time, UE needs to negotiate a security algorithm with the RNC. In this embodiment, negotiation of a security algorithm may be performed in a process of RRC Connection Setup. In the method in this embodiment, an existing security procedure may be kept unchanged, and an SMC procedure needs to be performed before; an SMC is included in RRC air interface signaling without increasing the number of pieces of air interface signaling. Because enciphering and deciphering of the NAS PDU are executed by the RNC, an enciphering function of an SGSN does not need to be enhanced. As shown in FIG. 10, the method in this embodiment may include:

Step 1001: UE sends an RRC connection request message to an RNC, where the RRC connection request message includes a small data indication and a KSI, and further includes a security algorithm supported by the UE.

The small data indication is used for informing the RNC that current transmission involves a small data service, and the KSI is used for enabling the SGSN to search for security context of small data to be transmitted. The security algorithm supported by the UE may be indicated by using a UE small data security capability (UE small data security capability).

Step 1002: The RNC sends a message including the small data indication and the KSI to an SGSN.

Specifically, a message including the small data indication and the KSI may further include a UE identifier P-TMSI of the UE, which is used for acquiring a security parameter corresponding to the UE. The message may be an initial UE message, or an uplink information exchange request (Uplink Information Exchange Request) message, or may also be another message.

Step 1003: The SGSN sends a message including a security parameter of the UE and a security algorithm supported by the SGSN to the RNC.

Specifically, the SGSN may search, according to the KSI, for security parameters CK_small and IK_small corresponding to the UE, and then send the security parameters to the RNC. The security parameters may be sent to the RNC by using a Common ID (Common ID) message or a Direct Transfer (Direct Transfer) message, where the message may also be an uplink information exchange response (Uplink Information Exchange Response) message, (which is used in pair with the uplink information exchange request message in step 1002), or may also be another message. The message includes the security algorithm that is supported by the SGSN and is suitable for small data, a cipher algorithm (permitted UIA_small) of the small data, and an integrity protection algorithm (permitted UEA_small) for the small data.

Step 1004: The RNC determines a security algorithm of current transmission according to the security algorithm supported by the UE and the security algorithm supported by the SGSN, and generates a Fresh value.

The security algorithm of current transmission determined by the RNC may be marked as selected UEA_small and selected UIA_small.

Step 1005: The RNC sends an RRC Connection Setup message to the UE, where the RRC Connection Setup message includes the security algorithm of current transmission and the Fresh value.

Step 1006: The UE performs security processing on a NAS PDU.

Specifically, the UE may use the security parameters CK_small and IK_small, the security algorithms selected UEA_small and selected UIA_small determined by the RNC, and the anti-replay parameter to encipher the NAS PDU encapsulated with the data to be transmitted.

Specifically, the UE may use the security parameters CK_small and IK_small, preset security algorithms selected UEA_small and selected UIA_small, and the anti-replay parameter to encipher the NAS PDU encapsulated with the data to be transmitted.

Step 1007: The UE sends an RRC Connection Setup Complete message to the RNC, where the RRC Connection Setup Complete message includes the NAS PDU that has undergone security processing and a Start value.

Step 1008: The RNC deciphers the NAS PDU.

Specifically, step 1008 may further include performing an operation such as integrity check on the NAS PDU.

Step 1009: The RNC sends the NAS PDU obtained after the deciphering to the SGSN.

Specifically, the RNC may send the NAS PDU by using a Direct Transfer (Direct Transfer) message, and the Direct Transfer message may further include a Bearer ID.

Step 1010: The SGSN sends a response message to the RNC.

Step 1010 and subsequent step 1011 are a group of optional steps, and only need to be executed when downlink response data exists or an acknowledgment (ACK) message needs to be returned.

Specifically, when a downlink response message exists, the SGSN may send the downlink response message to the RNC by using a Direct Transfer message.

Step 1011: The RNC performs security processing on the response message.

Specifically, a same security parameter may be used to perform security processing on the response message, or a specific security parameter may also be changed. If a specific security parameter is changed, for example, an anti-replay parameter is changed, the UE needs to be informed in a subsequent step.

Step 1012: The RNC sends the response message obtained through security processing to the UE.

Specifically, an RRC Connection Release (RRC Connection Release) message may be used to return the response message to the UE.

This embodiment provides a procedure of transmitting small data in a scenario in which an RNC deciphers a small data packet and a security algorithm is negotiated each time a small data packet is transmitted. A security algorithm is negotiated in an RRC Connection Setup procedure, UE performs security processing on data to be transmitted, and the RNC performs deciphering and sends the small data packet obtained after the deciphering to an SGSN, so as to complete transmission of small data, and ensure transmission security of small data.

The foregoing embodiment is described by using an example of a manner in which for an anti-replay mechanism, Count_C and Count_I generated by using a start value Start saved in a UE, and a fresh value Fresh generated by an RNC, are used as an anti-replay parameter; for the anti-replay mechanism, in one manner, Count_C_small and Count_I_small that are separately maintained for small data may also be used as an anti-replay parameter, or, in another manner, a random number Nonce value may be used as an anti-replay parameter. When the anti-replay mechanism in the other two manners are used, the parameter that needs to be carried in each message is correspondingly changed according to a demand of each manner, and for a specific implementation manner, reference may be made to the description in Embodiment 5.

Figure 11:
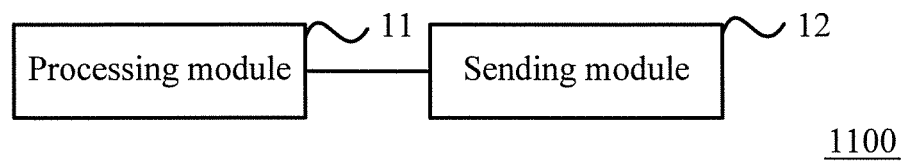
FIG. 11 is a schematic structural diagram of Embodiment 1 of a data transmission apparatus according to the present invention.

FIG. 11 is a schematic structural diagram of Embodiment 1 of a data transmission apparatus according to the present invention. The apparatus 1100 in this embodiment may be disposed on a UE, and as shown in FIG. 11, the apparatus in this embodiment may include: a processing module 11 and a sending module 12, where:

the processing module 11 is configured to perform security processing on a non-access stratum protocol data unit NAS PDU by using a security parameter and a security algorithm, where data to be transmitted is encapsulated in the NAS PDU; and the sending module 12 is configured to send the NAS PDU to a Serving General Packet Radio Service Support Node SGSN by using a radio network controller RNC.

The apparatus in this embodiment may be configured to execute the technical solution of the method embodiment shown in FIG. 1, and the technical solution executed by the corresponding UE in the method embodiment shown in any one of FIG. 4 to FIG. 10 has a similar implementation principle, and details are not described herein again.

A technical effect of the apparatus in this embodiment is that, a small data packet to be transmitted is encapsulated into a NAS PDU, security processing is performed on the NAS PDU by using a security parameter and a security algorithm, and then the NAS PDU is directly carried in a message of control plane signaling for transmission, so that a process of establishing a data transmission channel by using multiple pieces of user plane signaling can be omitted, thereby greatly simplifying a procedure of data transmission, improving efficiency of data transmission, and further ensuring transmission security of data.

In the foregoing embodiment, further, the security parameter may include: a cipher key CK_small and/or an integrity protection key IK_small; and the security algorithm may include: a cipher algorithm and/or an integrity protection algorithm.

Figure 12:
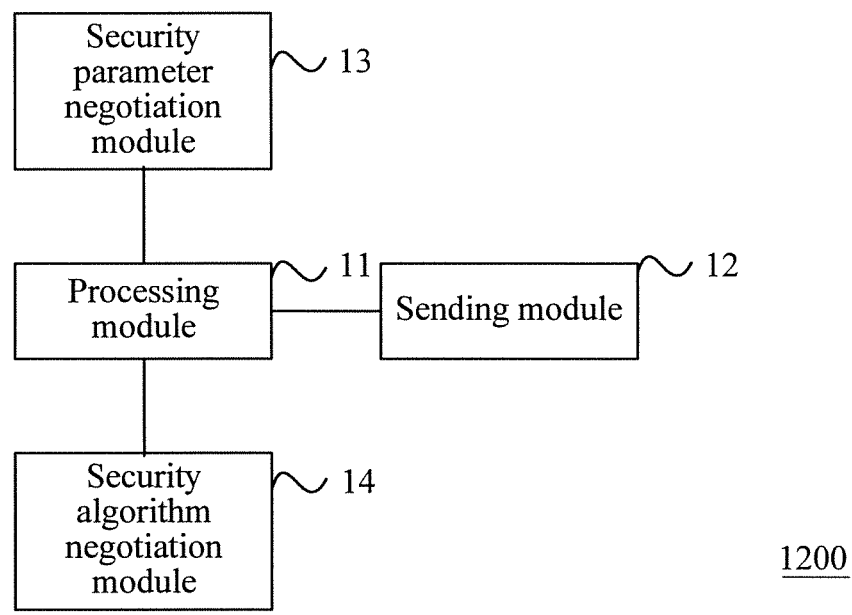
FIG. 12 is a schematic structural diagram of Embodiment 2 of a data transmission apparatus according to the present invention.

FIG. 12 is a schematic structural diagram of Embodiment 2 of a data transmission apparatus according to the present invention. The apparatus 1200 in this embodiment may be disposed on a UE, and as shown in FIG. 12, on the basis of the apparatus shown in FIG. 11, the apparatus in this embodiment may further include a security parameter negotiation module 13.

The security parameter negotiation module 13 may be configured to: before security processing is performed on the NAS PDU by using the security parameter and the security algorithm, negotiate with the SGSN to determine the security parameter.

Further, the security parameter negotiation module 13 may be specifically configured to:

negotiate with the SGSN by performing an authentication and key agreement AKA process to determine the security parameter.

Alternatively, the security parameter negotiation module 13 may be specifically configured to:

negotiate with the SGSN by performing the AKA process to determine to use a cipher key CK in the AKA process as CK_small, and/or determine to use an integrity protection key IK in the AKA process as IK_small.

Further specifically, the security parameter negotiation module 13 is specifically configured to:

negotiate with the SGSN by performing the AKA process to determine to use Formula (1) to acquire CK_small, and/or determine to use Formula (2) to acquire IK_small;

$$CK\_small = HMAC\text{-}SHA\text{-}256(A1, A2, \text{cipher label}) \quad (1)$$

$$IK\_small = HMAC\text{-}SHA\text{-}256(A1, A2, \text{integrity label}) \quad (2)$$

where HMAC-SHA-256 is a key generation function, A1 and A2 are input parameters of the key generation function HMAC-SHA-256, A1 is CK, or a new character string [CK∥IK] obtained by joining character strings of CK and IK, A2 is a random number RAND in an authentication vector AV generated by an authentication center AuC in the AKA process, cipher label is a cipher algorithm label, and integrity label is an integrity protection algorithm label.

Alternatively, the security parameter negotiation module 13 may be specifically configured to:

receive, in a security mode command SMC process, a random number Nonce sent by the SGSN; and use, by the UE, Formula (1) to acquire CK_small, and/or determine to use Formula (2) to acquire IK_small, where A2 is the random number Nonce.

Further, the apparatus in this embodiment may further include: a security algorithm negotiation module 14, where the security algorithm negotiation module 14 may be configured to: before security processing is performed on the NAS PDU by using the security parameter and the security algorithm, negotiate with the SGSN to determine the security algorithm.

Further, the security algorithm negotiation module 14 may be specifically configured to:

negotiate with the SGSN by using a registration procedure of the UE to determine the security algorithm.

Specifically, the security algorithm negotiation module 14 may be specifically configured to:

add a security algorithm supported by the UE to a registration request Attach Request message or a routing area update request RAU Request message, and send the registration request Attach Request message or the routing area update request RAU Request message to the SGSN; and receive an SMC message sent by the SGSN, where the SMC message includes the security algorithm that is determined by the SGSN according to the security algorithm supported by the UE, or, receive a registration accept Attach accept message or a routing area accept RAU accept message sent by the SGSN, where the registration accept Attach accept message or the routing area accept RAU accept message includes the security algorithm that is determined by the SGSN according to the security algorithm supported by the UE.

Alternatively, the security algorithm negotiation module 14 may be specifically configured to:

negotiate with the SGSN by using a procedure of an inter-SGSN handover of the UE to determine the security algorithm.

Specifically, the security algorithm negotiation module 14 may be specifically configured to:

receive a radio access network mobility information RAN Mobility information message sent by a target RNC in the inter-SGSN handover, where the radio access network mobility information message includes the security algorithm determined by a target SGSN in the inter-SGSN handover.

Alternatively, the security algorithm negotiation module 14 may be specifically configured to:

negotiate with the SGSN by using a service request Service Request process of the UE to determine a security algorithm of a service; and negotiate with the SGSN to determine to use the security algorithm of the service as the security algorithm.

Specifically, the security algorithm negotiation module 14 may be specifically configured to:
- receive a security mode command SMC message sent by the RNC, where the SMC message carries the security algorithm of the service;
- save the security algorithm; and
- when a next SMC message sent by the RNC is received, use a security algorithm of a service carried in the next SMC message as the security algorithm.

Further, in this embodiment, the sending module 12 may be specifically configured to:
- send an RRC Connection Setup Complete message to the RNC, where the RRC Connection Setup Complete message carries the NAS PDU, so that the RNC sends the NAS PDU to the SGSN.

Further, the sending module 12 is further configured to:
- send an RRC connection request message to the RNC, where the RRC connection request message includes a small data indication.

Further, the RRC Connection Setup Complete message specifically includes: the NAS PDU and a key set identifier KSI, where the KSI is used for enabling the SGSN to search for security context for deciphering the NAS PDU.

The apparatus in this embodiment may be configured to execute the technical solution executed by the corresponding UE in the method embodiment shown in any one of FIG. 5 to FIG. 7, and the implementation principle and technical effect are similar, and are no longer elaborated herein.

Figure 13:
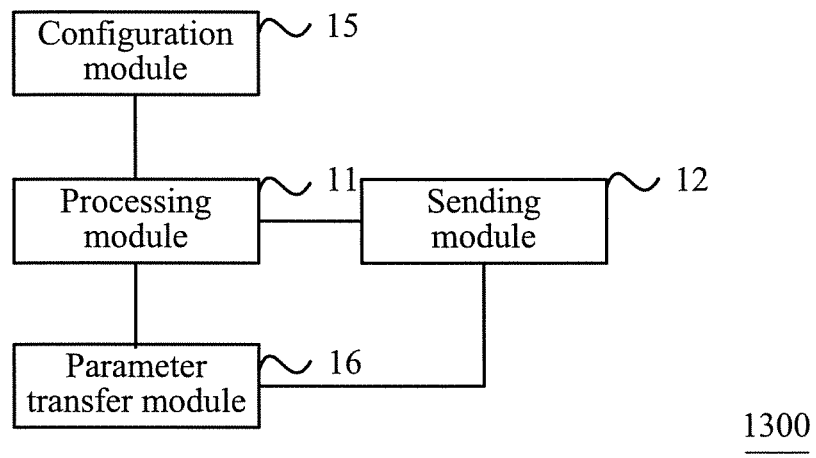
FIG. 13 is a schematic structural diagram of Embodiment 3 of a data transmission apparatus according to the present invention.

FIG. 13 is a schematic structural diagram of Embodiment 3 of a data transmission apparatus according to the present invention. The apparatus 1300 in this embodiment may be disposed on a UE, and as shown in FIG. 13, on the basis of the apparatus shown in FIG. 11, the apparatus in this embodiment may further include a configuration module 15.

The configuration module 15 is configured to: before security processing is performed on the NAS PDU by using the security parameter and the security algorithm, configure a security algorithm same as a small data security algorithm on the RNC as the security algorithm.

Further, the sending module 12 is specifically configured to:
- send an RRC Connection Setup Complete message to the RNC, where the RRC Connection Setup Complete message carries the NAS PDU, so that the RNC obtains the NAS PDU through deciphering and sends the NAS PDU to the SGSN.

Further, the apparatus in this embodiment may further include:
- a parameter transfer module 16, configured to: before the RRC Connection Setup Complete message is sent to the RNC, receive, by the UE, an RRC Connection Setup message sent by the RNC, where the RRC Connection Setup message includes a fresh value Fresh; and
- the processing module 11 is specifically configured to:
- perform security processing on the NAS PDU by using the security parameter, the security algorithm, and the Fresh.

Further, the parameter transfer module 16 is further configured to:
- before the RRC Connection Setup message sent by the RNC is received, send an RRC connection request message to the RNC, where the RRC connection request message includes a small data indication and a KSI, so that the RNC sends the small data indication and the KSI to the SGSN.

Further, the processing module is specifically configured to:
- perform security processing on the NAS PDU by using the security parameter, the security algorithm, and an anti-replay parameter; and the RRC Connection Setup Complete message further carries the anti-replay parameter.

Further, the anti-replay parameter includes: a start value Start and a fresh value Fresh; or, Count_C and/or Count_I generated according to a start value Start, and a fresh value Fresh; or, Count_C_small and/or Count_I_small dedicated to small data.

Further, the RRC connection request message further carries a first random number Nonce_UE generated by the UE;
- the RRC Connection Setup message further carries a second random number Nonce_RNC generated by the RNC; and
- the anti-replay parameter includes: the first random number Nonce_UE and the second random number Nonce_RNC.

Further, to adapt to a scenario in which the UE negotiates a security algorithm with the RNC during transmission each time, the parameter transfer module 16 may be further configured to:
- before security processing is performed on the NAS PDU by using the security parameter and the security algorithm, receive an RRC Connection Setup message sent by the RNC, where the RRC Connection Setup message includes a security algorithm indicated by the RNC.

Further, the RRC Connection Setup message further includes: a fresh value Fresh generated by the RNC and a security algorithm supported by the UE.

Further, the parameter transfer module 16 is further configured to:
- before the RRC Connection Setup message sent by the RNC is received, send an RRC connection request message to the RNC, where the RRC connection request message includes a small data indication, a KSI, and a security algorithm supported by the UE; and
- the security algorithm that is indicated by the RNC and included in the RRC Connection Setup message is determined by the RNC according to the security algorithm supported by the UE.

The apparatus in this embodiment may be configured to execute the technical solution executed by the corresponding UE in the method embodiment shown in any one of FIG. 8 to FIG. 10, and the implementation principle and technical effect are similar, and are no longer elaborated herein.

Figure 14:
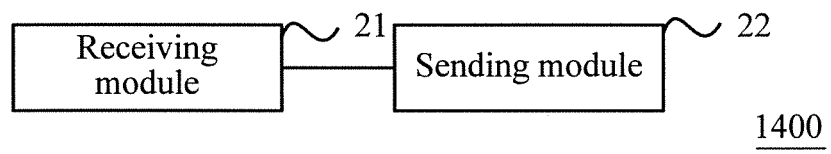
FIG. 14 is a schematic structural diagram of Embodiment 4 of a data transmission apparatus according to the present invention.

FIG. 14 is a schematic structural diagram of Embodiment 4 of a data transmission apparatus according to the present invention. The apparatus 1400 in this embodiment may be disposed on an RNC. The apparatus in this embodiment may include: a receiving module 21 and a sending module 22, where:
- the receiving module 21 is configured to receive a non-access stratum protocol data unit NAS PDU that is sent by user equipment UE and has undergone security processing, where data to be transmitted is encapsulated in the NAS PDU; and
- the sending module 22 is configured to send the NAS PDU to a Serving General Packet Radio Service Support Node SGSN.

The apparatus in this embodiment may be configured to execute the technical solution of the method embodiment shown in FIG. 2, and the technical solution executed by the corresponding RNC in the method embodiment shown in any one of FIG. 4 to FIG. 10 has a similar implementation principle, and details are not described herein again.

A technical effect of the apparatus in this embodiment is that, an RNC receives, by using control plane signaling, a small data packet that is sent by UE and encapsulated into a NAS PDU and has undergone security processing, thereby greatly simplifying a procedure of data transmission, improving efficiency of data transmission, and further ensuring transmission security of data.

Further, the security processing may include: security processing performed on the NAS PDU by using a security parameter and a security algorithm, where
  the security parameter includes: a cipher key CK_small and/or an integrity protection key IK_small; and
  the security algorithm includes: a cipher algorithm and/or an integrity protection algorithm.

Figure 15:
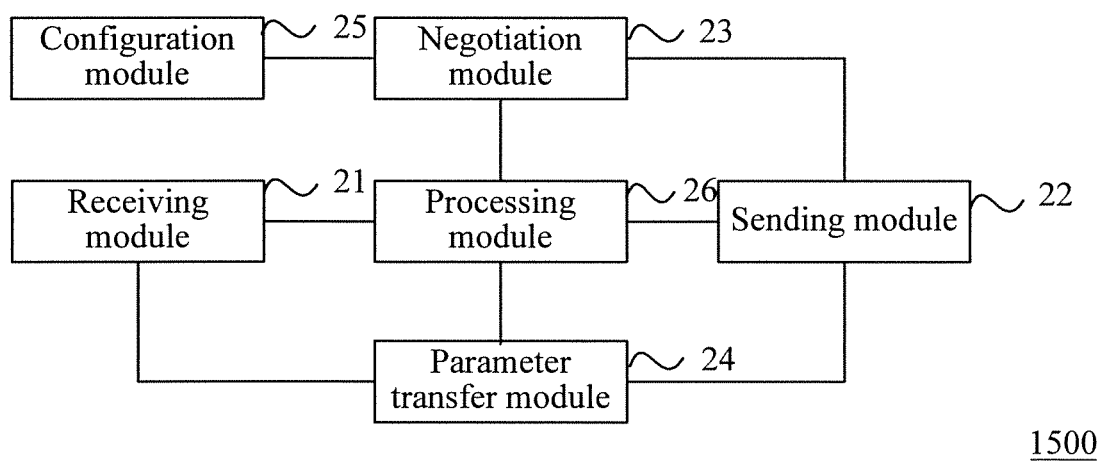
FIG. 15 is a schematic structural diagram of Embodiment 5 of a data transmission apparatus according to the present invention.

FIG. 15 is a schematic structural diagram of Embodiment 5 of a data transmission apparatus according to the present invention. The apparatus 1500 in this embodiment may be disposed on an RNC. On the basis of the apparatus shown in FIG. 14, the apparatus in this embodiment may further include a negotiation module 23.

The negotiation module 23 may be configured to: before the NAS PDU that is sent by the UE and has undergone security processing is received, receive a security mode command SMC message sent by the SGSN, where the SMC message includes a random number Nonce generated by the SGSN; and
  send the SMC message including the random number Nonce to the UE, so that the UE acquires the security parameter according to the random number Nonce.

Further, the negotiation module 23 is further configured to:
  before the NAS PDU that is sent by the UE and has undergone security processing is received, receive, in a registration procedure of the UE, a message that is sent by the UE and includes a security algorithm supported by the UE, and send the message to the SGSN; and
  receive a message that is sent by the SGSN and includes a security algorithm indicated by the SGSN, and send the message to the UE.

Alternatively, the negotiation module 23 is further configured to:
  before the NAS PDU that is sent by the UE and has undergone security processing is received, receive, in a procedure of an inter-SGSN handover of the UE, a relocation request Relocation Request message that is sent by a target SGSN and includes a security algorithm indicated by the target SGSN; and
  send a radio access network mobility information RAN Mobility information message to the UE, where the radio access network mobility information message includes the security algorithm indicated by the target SGSN.

Further, the receiving module 21 may be specifically configured to:
  receive an RRC Connection Setup Complete message sent by the UE, where the RRC Connection Setup Complete message carries the NAS PDU, a key set identifier KSI, and an anti-replay parameter; and
  the sending module 22 is specifically configured to:
  send the NAS PDU, the KSI, and the anti-replay parameter to the SGSN, where the KSI is used for enabling the SGSN to search for security context for deciphering the NAS PDU.

Further, the anti-replay parameter includes: a start value Start and a fresh value Fresh; or, Count_C and/or Count_I generated according to a start value Start, and a fresh value Fresh; or, Count_C_small and/or Count_I_small dedicated to small data.

Further, the apparatus in this embodiment may further include: a parameter transfer module 24.

The parameter transfer module 24 may be configured to: before the RRC Connection Setup Complete message sent by the UE is received, receive an RRC connection request message sent by the UE, where the RRC connection request message includes a small data indication.

Further, the apparatus may further include: a configuration module 25. The configuration module 25 is configured to: before the NAS PDU that is sent by the UE and has undergone security processing is received, configure a security algorithm same as a small data security algorithm of the UE as the security algorithm.

Further, the apparatus in this embodiment may further include: a processing module 26.

The processing module 26 is configured to: before the NAS PDU is sent to the SGSN, decipher the NAS PDU.

Further, the parameter transfer module 24 may be further configured to: before the NAS PDU is deciphered, send a security parameter acquisition request message to the SGSN, where the security parameter acquisition request message includes a key set identifier KSI of the UE, or, the security parameter acquisition request message includes a KSI of the UE and a small data indication; and
  receive a security parameter response message sent by the SGSN, where the security parameter response message includes a security parameter corresponding to the KSI, or,
  may be configured to receive a security parameter response message sent by the SGSN, where the security parameter response message includes a security parameter corresponding to the KSI and Count_C_small and/or Count_I_small dedicated to small data;
  update Count_C_small and/or Count_I_small dedicated to small data; and
  after the NAS PDU is sent to the SGSN, send the updated Count_C_small and/or Count_I_small dedicated to small data to the SGSN, so that the SGSN updates the Count_C_small and/or Count_I_small dedicated to small data.

Further, the security parameter response message may further include: a security algorithm selected by the SGSN.

Further, the security parameter acquisition request message may be an initial UE message, and the security parameter response message may be a command ID message or a Direct Transfer message, or,
  the security parameter acquisition request message may be an uplink information exchange request message, and the security parameter response message may be an uplink information exchange response message.

Further, the parameter transfer module 24 may be further configured to:
  before the NAS PDU that is sent by the UE and has undergone security processing, send an RRC Connection Setup message to the UE, where the RRC Connection Setup message includes a fresh value Fresh;
  correspondingly, the receiving module 21 may be specifically configured to:
  receive an RRC Connection Setup Complete message sent by the UE, where the RRC Connection Setup Complete message carries the NAS PDU that has undergone security processing performed by using the security algorithm, the security parameter, and the fresh value Fresh; and the processing module 26 may be specifically configured to:

decipher, by the RNC, the NAS PDU by using the security algorithm, the security parameter, and the fresh value Fresh.

Further, the parameter transfer module 24 may be further configured to:

before the UE sends the RRC Connection Setup message, receive an RRC connection request message sent by the UE, where the RRC connection request message includes a small data indication and a KSI; or, the RRC Connection Setup Complete message further includes: a KSI; and the security parameter acquisition request message sent to the SGSN carries the small data indication and the KSI, so as to enable the SGSN to search for security context of the NAS PDU.

Further, the NAS PDU carried in the RRC Connection Setup Complete message is the NAS PDU that has undergone security processing performed by using the security algorithm, the security parameter, and an anti-replay parameter;

the RRC Connection Setup message further includes: the anti-replay parameter; and the processing module may be specifically configured to:

decipher the NAS PDU by using the security algorithm, the security parameter, and the anti-replay parameter.

Further, the RRC connection request message further carries a first random number Nonce_UE generated by the UE;

the RRC Connection Setup message further carries a second random number Nonce_RNC generated by the RNC; and the anti-replay parameter includes: the first random number Nonce_UE and the second random number Nonce_RNC.

Further, the negotiation module 23 is further configured to:

before the RRC Connection Setup message is sent to the UE, determine a security algorithm of current transmission; and the RRC Connection Setup message includes indication information of the security algorithm of current transmission determined by the RNC, the fresh value Fresh, and the security algorithm supported by the UE.

Further, the parameter transfer module 24 may be specifically configured to:

receive an RRC connection request message sent by the UE, where the RRC connection request message further includes the security algorithm supported by the UE; and receive a security parameter response message sent by the SGSN, where the security parameter response message further includes a security algorithm supported by the SGSN;

the negotiation module 23 may be specifically configured to:

determine, by the RNC, the security algorithm of current transmission according to the security algorithm supported by the UE and the security algorithm supported by the SGSN; and the RRC Connection Setup message sent by the parameter transfer module 24 to the UE includes the indication information of the security algorithm of current transmission determined by the RNC, the Fresh value, and the security algorithm supported by the UE.

The apparatus in this embodiment may be configured to execute the technical solution executed by the corresponding UE in the method embodiment shown in any one of FIG. 4 to FIG. 10, and the implementation principle and technical effect are similar, and are no longer elaborated herein.

Figure 16:
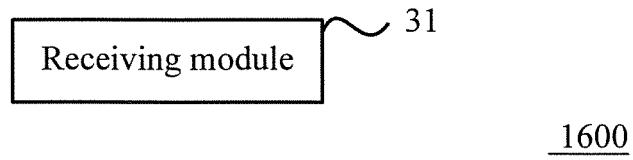
FIG. 16 is a schematic structural diagram of Embodiment 6 of a data transmission apparatus according to the present invention.

FIG. 16 is a schematic structural diagram of Embodiment 6 of a data transmission apparatus according to the present invention. The apparatus 1600 in this embodiment may be disposed on an SGSN. The apparatus in this embodiment may include a receiving module 31.

The receiving module 31 may be configured to receive a non-access stratum protocol data unit NAS PDU sent by an RNC, where the NAS PDU is sent by user equipment UE to the RNC after the UE performs security processing on the NAS PDU by using a security algorithm and a security parameter.

The apparatus in this embodiment may be configured to execute the technical solution of the method embodiment shown in FIG. 3, and the technical solution executed by the corresponding SGSN in the method embodiment shown in any one of FIG. 4 to FIG. 10 has a similar implementation principle, and details are not described herein again.

A technical effect of the apparatus in this embodiment is that, an SGSN receives, by using control plane signaling, a NAS PDU that is from UE and is forwarded by an RNC or is forwarded by an RNC after deciphering by the RNC, the NAS PDU being encapsulated with a small data packet and having undergone security processing, thereby greatly simplifying a procedure of data transmission, improving efficiency of data transmission, and further ensuring transmission security of data.

In the foregoing embodiment, specifically, the security parameter includes: a cipher key CK_small and/or an integrity protection key IK_small; and the security algorithm includes: a cipher algorithm and/or an integrity protection algorithm.

Figure 17:
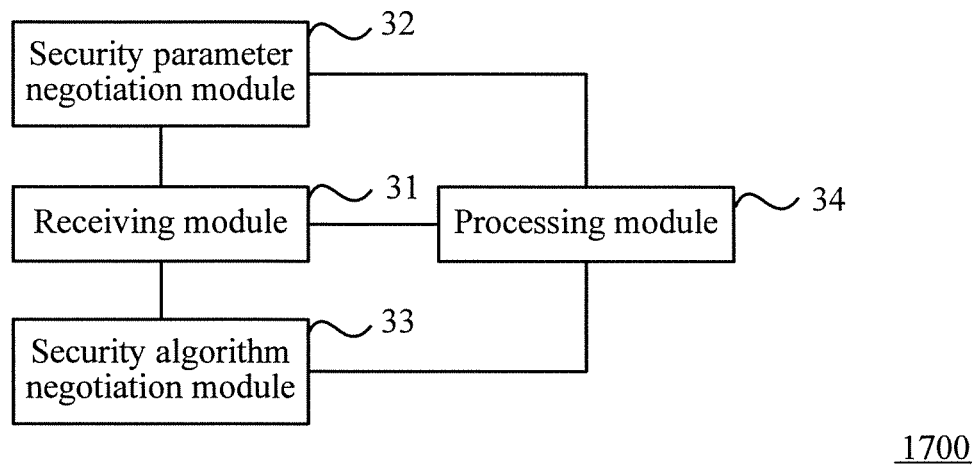
FIG. 17 is a schematic structural diagram of Embodiment 7 of a data transmission apparatus according to the present invention.

FIG. 17 is a schematic structural diagram of Embodiment 7 of a data transmission apparatus according to the present invention. The apparatus 1700 in this embodiment may be disposed on an SGSN. On the basis of the apparatus shown in FIG. 16, the apparatus in this embodiment may further include a security parameter negotiation module 32.

The security parameter negotiation module 32 may be configured to: before the NAS PDU that is sent by the UE and has undergone security processing performed by using the security algorithm and the security parameter is received, negotiate with the UE to determine the security parameter.

Further, the security parameter negotiation module 32 may be specifically configured to:

negotiate with the UE by performing an authentication and key agreement AKA process to determine the security parameter.

Further specifically, the security parameter negotiation module 32 may be specifically configured to:

negotiate with the UE by performing the AKA process to determine to use a cipher key CK in the AKA process as CK_small, and/or determine to use an integrity protection key IK in the AKA process as IK_small.

Alternatively, the security parameter negotiation module 32 may be specifically configured to:

negotiate with the UE by performing the AKA process to determine to use Formula (1) to acquire CK_small, and/or determine to use Formula (2) to acquire IK_small;

$$CK\_small = HMAC\text{-}SHA\text{-}256(A1, A2, \text{cipher label}) \quad (1)$$

$$IK\_small = HMAC\text{-}SHA\text{-}256(A1, A2, \text{integrity label}) \quad (2)$$

where HMAC-SHA-256 is a key generation function, A1 and A2 are input parameters of the key generation function HMAC-SHA-256, A1 is CK, or a new character string [CK∥IK] obtained by joining character strings of CK and IK, A2 is a random number RAND in an authentication vector AV generated by an authentication center AuC in the AKA process, cipher label is a cipher algorithm label, and integrity label is an integrity protection algorithm label.

Alternatively, the security parameter negotiation module 32 may be specifically configured to:

send, by the SGSN, a random number Nonce to the UE in a security mode command SMC process;

use, by the SGSN and the UE, Formula (1) to acquire CK_small, and/or determine to use Formula (2) to acquire IK_small, where A2 is the random number Nonce.

Further, the apparatus in this embodiment may further include: a security algorithm negotiation module 33.

The security algorithm negotiation module 33 may be configured to: before the NAS PDU sent by the RNC is received, negotiate with the UE to determine the security algorithm.

Further, the security algorithm negotiation module 33 may be specifically configured to:

negotiate with the UE by using a registration procedure of the UE to determine the security algorithm.

Further specifically, the security algorithm negotiation module 33 may be specifically configured to:

receive a registration request Attach request message or a routing area update request RAU Request message that is sent by the UE and includes a security algorithm supported by the UE; and send a registration accept Attach Accept message or a routing area accept RAU accept message to the UE, where the registration accept Attach accept message or the routing area accept RAU accept message includes the security algorithm that is determined by the SGSN according to the security algorithm supported by the UE, or, send an SMC message to the UE, where the SMC message includes the security algorithm that is determined by the SGSN according to the security algorithm supported by the UE.

Alternatively, the security algorithm negotiation module 33 may be specifically configured to:

negotiate with the UE by using a procedure of an inter-SGSN handover of the UE to determine the security algorithm.

Specifically, the security algorithm negotiation module 33 may be specifically configured to:

receive a forward relocation request message sent by a source SGSN, where the forward relocation request message includes a security algorithm determined by the source SGSN, the security parameter of the UE, and the security algorithm supported by the UE; and send a relocation request message to a target RNC, where the relocation request message includes a security algorithm determined by a target SGSN.

Alternatively, the security algorithm negotiation module 33 may be specifically configured to:

negotiate with the UE by using a service request Service Request process of the UE to determine a security algorithm of a service; and negotiate with the UE to determine to use the security algorithm of the service as the security algorithm.

Further specifically, the security algorithm negotiation module 33 may be specifically configured to:

receive a security mode command SMC complete message sent by the RNC, where the SMC complete message carries the security algorithm of the service;

save the security algorithm; and when a next SMC complete message sent by the RNC is received, use a security algorithm of a service carried in the next SMC complete message as the security algorithm.

Further, the receiving module 31 may be specifically configured to:

receive a message that is sent by the RNC and includes the NAS PDU, where the NAS PDU is sent by the UE and received by the RNC and has undergone security processing performed by the UE by using the security algorithm and the security parameter; and the apparatus in this embodiment may further include: a processing module 34, configured to decipher the NAS PDU.

Further, the message that is sent by the RNC and received by the receiving module 31 and includes the NAS PDU further carries a key set identifier KSI, where the KSI is used for enabling the SGSN to search for security context for deciphering the NAS PDU; and the processing module 34 may be specifically configured to:

decipher the NAS PDU by using the security context.

Further, the message that is sent by the RNC and received by the receiving module 31 and includes the NAS PDU further carries an anti-replay parameter; and the processing module 34 may be specifically configured to:

decipher the NAS PDU by using the security context and the anti-replay parameter.

The apparatus in this embodiment may be configured to execute the technical solution executed by the corresponding SGSN in the method embodiment shown in any one of FIG. 4 to FIG. 7, and the implementation principle and technical effect are similar, and are no longer elaborated herein.

Figure 18:
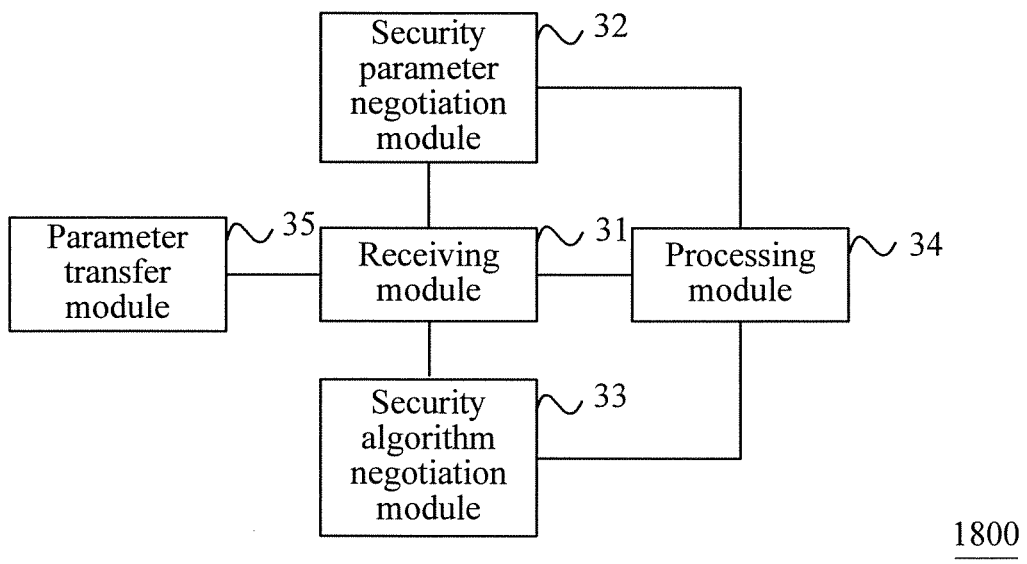
FIG. 18 is a schematic structural diagram of Embodiment 8 of a data transmission apparatus according to the present invention.

FIG. 18 is a schematic structural diagram of Embodiment 8 of a data transmission apparatus according to the present invention. The apparatus 1800 in this embodiment may be disposed on an SGSN. In this embodiment, a receiving module 31 may be specifically configured to:

receive a message that is sent by an RNC and includes a NAS PDU, where the NAS PDU is sent by UE and received by the RNC, having undergone security processing performed by the UE by using a security algorithm and a security parameter, and having undergone deciphering by the RNC; and the apparatus in this embodiment further includes: a parameter transfer module 35, and the parameter transfer module 35 may be configured to:

before the NAS PDU that is sent by the UE and has undergone security processing performed by using the security algorithm and the security parameter is received, receive a security parameter acquisition request message sent by the RNC, where the security parameter acquisition request message includes a Key set identifier KSI of the UE and a small data indication; and send a security parameter response message to the RNC, where the security parameter response message includes a security parameter corresponding to the Key set identifier.

Further, the security parameter response message sent by the parameter transfer module 35 to the RNC may further include: a security algorithm selected by the security algorithm negotiation module.

Further, the security parameter response message sent by the parameter transfer module 35 to the RNC may further include: Count_C_small and/or Count_I_small dedicated to small data; and the parameter transfer module 35 is further configured to:
after the message that is sent by the RNC and includes the NAS PDU is received, receive updated Count_C_small and/or Count_I_small dedicated to small data sent by the RNC.

Further, the security parameter acquisition request message may be an initial UE message, and the security parameter response message may be a command ID message or a Direct Transfer message, or, the security parameter acquisition request message may be an uplink information exchange request message, and the security parameter response message may be an uplink information exchange response message.

The apparatus in this embodiment may be configured to execute the technical solution executed by the corresponding SGSN in the method embodiment shown in any one of FIG. 8 to FIG. 10, and the implementation principle and technical effect are similar, and are no longer elaborated herein.

Figure 19:
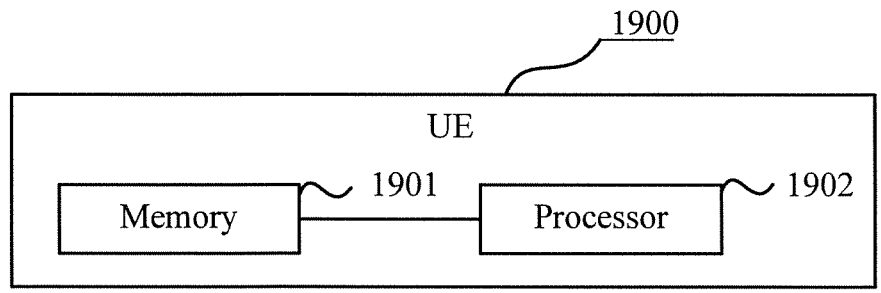
FIG. 19 is a schematic structural diagram of an embodiment of UE according to the present invention.

FIG. 19 is a schematic structural diagram of an embodiment of UE according to the present invention. As shown in FIG. 19, the UE 1900 in this implementation may include a memory 1901 and a processor 1902, where the memory 1901 may be configured to store an instruction; and the processor 1902 is coupled to the memory 1901, the processor is configured to execute the instruction stored in the memory, and the processor is configured to execute the data transmission method executed by the corresponding UE in the method embodiment shown in FIG. 1 and the method embodiment shown in any one of FIG. 4 to FIG. 10.

Figure 20:
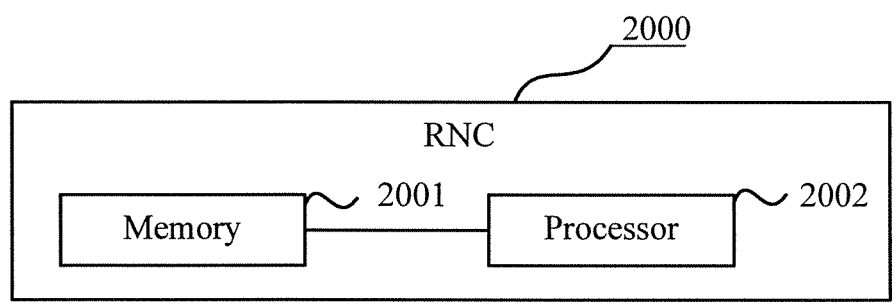
FIG. 20 is a schematic structural diagram of an embodiment of an RNC according to the present invention.

FIG. 20 is a schematic structural diagram of an embodiment of an RNC according to the present invention. As shown in FIG. 20, the RNC 2000 in this implementation may include a memory 2001 and a processor 2002, where the memory 2001 may be configured to store an instruction; and the processor 2002 is coupled to the memory 2001, the processor is configured to execute the instruction stored in the memory, and the processor is configured to execute the data transmission method executed by the corresponding RNC in the method embodiment shown in FIG. 2 and the method embodiment shown in any one of FIG. 4 to FIG. 10.

Figure 21:
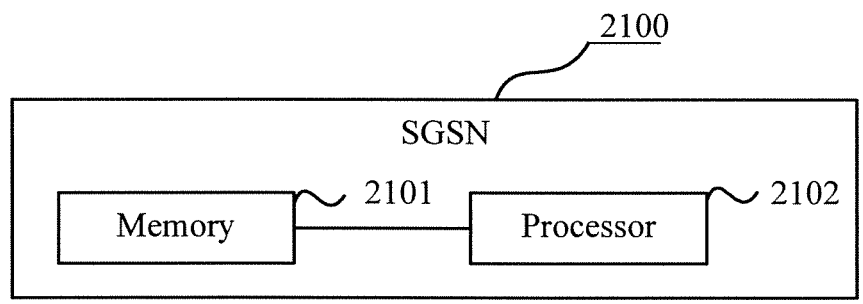
FIG. 21 is a schematic structural diagram of an embodiment of an SGSN according to the present invention.

FIG. 21 is a schematic structural diagram of an embodiment of an SGSN according to the present invention. As shown in FIG. 21, the SGSN 2100 in this implementation may include a memory 2101 and a processor 2102, where the memory 2101 may be configured to store an instruction; and the processor 2102 is coupled to the memory 2101, the processor is configured to execute the instruction stored in the memory, and the processor is configured to execute the data transmission method executed by the corresponding SGSN in the method embodiment shown in FIG. 3 and the method embodiment shown in any one of FIG. 4 to FIG. 10.

Figure 22:
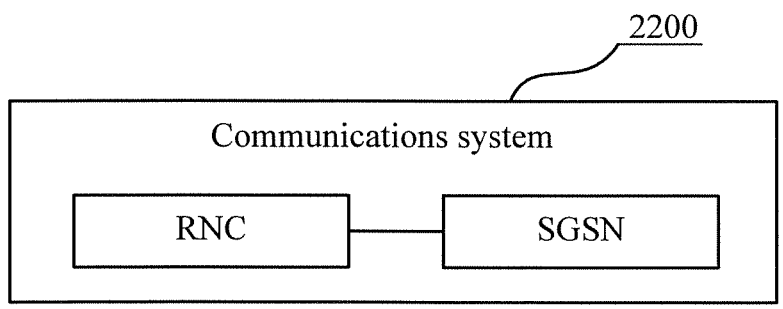
FIG. 22 is a schematic structural diagram of an embodiment of a communications system according to the present invention.

FIG. 22 is a schematic structural diagram of an embodiment of a communications system according to the present invention. As shown in FIG. 22, the communications system 2200 in this embodiment may include the RNC in any embodiment of the present invention and the SGSN in any embodiment of the present invention.

It should be noted that in each embodiment of the present invention, forwarding of a base station NodeB may be used in interaction between UE and an RNC. In each embodiment of the present invention, the deciphering may include deciphering by using an enciphering and deciphering algorithm UEA, and may also include integrity check by using an integrity protection algorithm UIA.

In each embodiment of the present invention, in a process in which the UE encapsulates small data to be transmitted, the small data is not limited to being encapsulated into a NAS PDU, and may also be encapsulated into a high-level data packet. A format of encapsulation is not limited in the embodiments of the present invention, as long as data to be transmitted is encapsulated and encapsulated data may be transmitted by using a signaling message.

The SGSN in each embodiment of the present invention may also be replaced by another core network node. In each apparatus embodiment of the present invention, a data transmission apparatus that may be correspondingly installed on an SGSN may also be installed on another core network node to execute the data transmission method executed by the corresponding SGSN in the various method embodiments. Another core network node is, for example, a Gateway General Radio Packet Service Support Node GGSN (Gateway General Packet Radio Service Support Node, GGSN for short) or signaling gateway (Signal Gateway, SGW for short) or an application server.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method, comprising:
sending, by the user equipment (UE), a radio resource control (RRC) connection request message to a radio network controller (RNC), wherein the RRC connection request message comprises a security algorithm supported by the UE;
receiving, by the UE, an RRC Connection Setup message sent by the RNC, wherein the RRC Connection Setup message comprises a security algorithm indicated by the RNC that corresponds to the security algorithm supported by the UE;
performing, by the UE, security processing on a non-access stratum protocol data unit (NAS PDU) using a security parameter and the security algorithm indicated by the RNC, wherein data to be transmitted is encapsulated in the NAS PDU; and sending, by the UE, the NAS PDU to a Serving General Packet Radio Service Support Node (SGSN) by using the RNC.

2. The method according to claim 1, wherein:
the security parameter comprises: a cipher key CK_small and/or an integrity protection key IK_small; and
the security algorithm comprises: a cipher algorithm and/or an integrity protection algorithm.

3. The method according to claim 1, wherein sending, by the UE, the NAS PDU to an SGSN comprises:
sending, by the UE, a radio resource control (RRC) Connection Setup Complete message that carries the NAS PDU to the RNC for enabling the RNC to send the NAS PDU to the SGSN.

4. The method according to claim 3, wherein the RRC Connection Setup Complete message comprises:
the NAS PDU and a key set identifier (KSI), where the KSI enables the SGSN to search for security context for deciphering the NAS PDU.

5. The method according to claim 1,
wherein the RRC connection request message further comprises a small data indication, and a key set identifier (KSI).

6. A user equipment, comprising:
a transmitter, configured to send a radio resource control (RRC) connection request message to a radio network controller (RNC), wherein the RRC connection request message comprises a security algorithm supported by the UE;
a receiver, configured to receive an RRC Connection Setup message sent by the RNC, wherein the RRC Connection Setup message comprises a security algorithm indicated by the RNC that corresponds to the security algorithm supported by the UE;
a processor, configured to perform security processing on a non-access stratum protocol data unit (NAS PDU) using a security parameter and the security algorithm indicated by the RNC, wherein data to be transmitted is encapsulated in the NAS PDU,
wherein the transmitter is further configured to send the NAS PDU to a Serving General Packet Radio Service Support Node (SGSN) by using the RNC.

7. The user equipment according to claim 6, wherein:
the security parameter comprises: a cipher key CK_small and/or an integrity protection key IK_small; and
the security algorithm comprises: a cipher algorithm and/or an integrity protection algorithm.

8. The user equipment according to claim 6, wherein the transmitter is further configured to send a radio resource control (RRC) Connection Setup Complete message that carries the NAS PDU to the RNC for enabling the RNC to send the NAS PDU to the SGSN.

9. The user equipment according to claim 8, wherein the RRC Connection Setup Complete message comprises:
the NAS PDU and a key set identifier (KSI), where the KSI enables the SGSN to search for security context for deciphering the NAS PDU.

10. The user equipment according to claim 6, wherein the RRC connection request message further comprises a small data indication, and a key set identifier (KSI).

* * * * *